United States Patent
Park et al.

(10) Patent No.: US 11,763,799 B2
(45) Date of Patent: Sep. 19, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Sangjun Park, Suwon-si (KR); Kyoungbo Min, Suwon-si (KR); Kihyun Choo, Suwon-si (KR); Seungdo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 17/554,547

(22) Filed: Dec. 17, 2021

(65) Prior Publication Data

US 2022/0148562 A1    May 12, 2022

Related U.S. Application Data

(63) Continuation of application No. PCT/KR2021/013996, filed on Oct. 12, 2021.

(30) Foreign Application Priority Data

Nov. 12, 2020  (KR) .......... 10-2020-0151150
Mar. 2, 2021   (KR) .......... 10-2021-0027665

(51) Int. Cl.
*G10L 13/08*     (2013.01)
*G10L 15/14*     (2006.01)
(Continued)

(52) U.S. Cl.
CPC ............ *G10L 13/047* (2013.01); *G10L 13/10* (2013.01)

(58) Field of Classification Search
CPC .......... G10L 13/08; G10L 15/14; G10L 15/06
See application file for complete search history.

(56) References Cited

U.S. PATENT DOCUMENTS 9,922,645 B2    3/2018  Melendo Casado et al.
11,176,943 B2  11/2021  Fume et al.
(Continued)

FOREIGN PATENT DOCUMENTS

JP    2019056791 A1    4/2019
KR  1020060027652 A    3/2006
(Continued)

OTHER PUBLICATIONS

Jia, Y., et al., "Transfer Learning from Speaker Verification to Multispeaker Text-To-Speech Synthesis", 32nd Conference on Neural Information Processing Systems, 2018, pp. 1-11.
(Continued)

*Primary Examiner* — Shreyans A Patel
(74) *Attorney, Agent, or Firm* — Sughrue Mion, PLLC

(57) ABSTRACT

An electronic apparatus and a controlling method thereof are provided. The electronic apparatus includes a microphone; a memory configured to store a text-to-speech (TTS) model and a plurality of evaluation texts; and a processor configured to: obtain a first reference vector of a user speech spoken by a user based the user speech being received through the microphone, generate a plurality of candidate reference vectors based on the first reference vector, obtain a plurality of synthesized sounds by inputting the plurality of candidate reference vectors and the plurality of evaluation texts to the TTS model, identify at least one synthesized sound of the plurality of synthesized sounds based on a similarity between characteristics of the plurality of synthesized sounds and the user speech, and store a second reference vector of the at least one synthesized sound in the memory as a reference vector corresponding to the user for the TTS model.

15 Claims, 16 Drawing Sheets

(51) Int. Cl.
  *G10L 15/06* (2013.01)
  *G10L 13/047* (2013.01)
  *G10L 13/10* (2013.01)

(56) References Cited

U.S. PATENT DOCUMENTS

| | | |
|---|---|---|
| 11,495,215 B1* | 11/2022 | Wu ................. G10L 15/063 |
| 11,508,358 B2 | 11/2022 | Chae |
| 11,514,887 B2 | 11/2022 | Kim et al. |
| 2016/0140951 A1 | 5/2016 | Agiomyrgiannakis et al. |
| 2019/0019500 A1 | 1/2019 | Jang et al. |
| 2019/0088258 A1 | 3/2019 | Fume et al. |
| 2019/0251952 A1 | 8/2019 | Arik et al. |
| 2020/0082807 A1 | 3/2020 | Kim et al. |
| 2020/0111482 A1 | 4/2020 | Chae |
| 2020/0135172 A1* | 4/2020 | Chen ................. G10L 13/047 |
| 2020/0279551 A1 | 9/2020 | Sung et al. |

FOREIGN PATENT DOCUMENTS

| | | |
|---|---|---|
| KR | 101203188 B1 | 11/2012 |
| KR | 1020130051278 A | 5/2013 |
| KR | 1020190008137 A | 1/2019 |
| KR | 10-2019-0085882 A | 7/2019 |
| KR | 20190085882 A * | 7/2019 |
| KR | 10-2019-0118539 A | 10/2019 |
| KR | 102087301 B1 | 3/2020 |
| KR | 10-2020-0091328 A | 7/2020 |
| KR | 1020200105259 A | 9/2020 |
| KR | 102401512 B1 * | 5/2022 |

OTHER PUBLICATIONS

International Search Report (PCT/ISA/210) and Written Opinion (PCT/ISA/237) dated Jan. 25, 2022 English issued by the International Searching Authority in International Application No. PCT/KR2021/013996.

* cited by examiner (1)

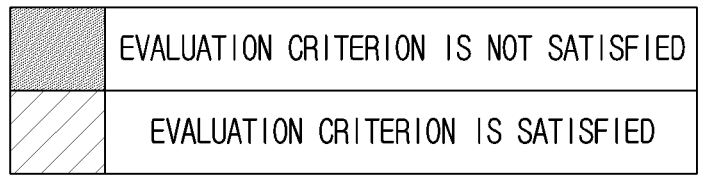

| SIMILARITY | $s_1^{r,A}$ | $s_2^{r,A}$ | $s_3^{r,A}$ | $s_4^{r,A}$ |
|---|---|---|---|---|
| $t_1$ | 55 | 67 | 83 | 85 |
| $t_2$ | 59 | 63 | 87 | 91 |
| $t_3$ | 64 | 59 | 85 | 75 |

EVALUATION CRITERION:
SPEAKER SIMILARITY IS 60 OR
MORE FOR ALL EVALUATION TEXTS (1)

| PROSODY | $s_1^{r,A}$ | $s_2^{r,A}$ | $s_3^{r,A}$ | $s_4^{r,A}$ |
|---|---|---|---|---|
| $t_1$ | 78 | 71 | 63 | 94 |
| $t_2$ | 63 | 76 | 87 | 78 |
| $t_3$ | 69 | 84 | 78 | 67 |

EVALUATION CRITERION:
PROSODY SCORE IS 80 OR
MORE FOR SPECIFIC TEXT (2)

| PRONUNCIATION | $s_1^{r,A}$ | $s_2^{r,A}$ | $s_3^{r,A}$ | $s_4^{r,A}$ |
|---|---|---|---|---|
| $t_1$ | 87 | 84 | 87 | 98 |
| $t_2$ | 84 | 86 | 95 | 91 |
| $t_3$ | 91 | 88 | 96 | 79 |

EVALUATION CRITERION:
PRONUNCIATION SCORE IS 90 OR
MORE FOR SPECIFIC TEXT (3)

| SOUND QUALITY | $s_1^{r,A}$ | $s_2^{r,A}$ | $s_3^{r,A}$ | $s_4^{r,A}$ |
|---|---|---|---|---|
| $t_1$ | 85 | 95 | 91 | 94 |
| $t_2$ | 79 | 86 | 89 | 91 |
| $t_3$ | 83 | 87 | 96 | 93 |

EVALUATION CRITERION:
SOUND QUALITY SCORE IS 80 OR
MORE FOR ALL EVALUATION TEXTS (4)

ELECTRONIC APPARATUS AND CONTROLLING METHOD THEREOF

CROSS-REFERENCE TO RELATED APPLICATION(S)

This application is a by-pass continuation of International PCT Application No. PCT/KR2021/013996, filed on Oct. 12, 2021, which claims priority to Korean Patent Application Nos. 10-2020-0151150, filed on Nov. 12, 2020 and 10-2021-0027665, filed on Mar. 2, 2021, in the Korean Intellectual Property Office, the disclosures of which are incorporated by reference herein in their entirety.

BACKGROUND

1. Field

The disclosure relates to an electronic apparatus and a controlling method thereof, and more particularly, to an electronic apparatus for providing a text to speech (TTS) service, and a controlling method thereof.

2. Description of the Related Art

Text to speech (TTS) refers to a speech synthesis technology in which a machine synthesizes (or converts) a text into a human speech.

To provide a speech of a style (for example, a pitch, an accent, a delivery speed, an intonation, a pronunciation, and a speaking habit) similar to a speech of a target speaker through a TTS service, a process of recording a speech spoken by the target speaker in advance and processing the recorded speech data is required. To implement a certain style of a natural speech similar to that of the target speaker for various texts, methods of model learning such as model adaptation and transfer learning based on a spoken speech of the target speaker for two hundred or more sentences (or a script of one hour or more) are required.

However, there is a difficulty in providing a personalized TTS service to a general user in that the target speaker must speak a very large number of sentences with an accurate pronunciation for a long time to register the speech of the target speaker. There is a method of obtaining a reference vector from the speech of the target speaker and inputting a text and the reference vector to a TTS model to obtain a synthesized sound having speech characteristics of the target speaker, to provide the personalized TTS service. In this method, there is an advantage that the model may not be trained (zero-shot/few-shot learned), but there is a disadvantage that it may not be known whether the reference vector provides optimal performance (sound quality/prosody/pronouncement/speaker similarity, and the like).

SUMMARY

Provided are an electronic apparatus for providing a text to speech (TTS) service using a speech of a general user, and a controlling method thereof.

In accordance with an aspect of the disclosure, there is provided an electronic apparatus including: a microphone; a memory configured to store a text-to-speech (TTS) model and a plurality of evaluation texts; and a processor configured to: obtain a first reference vector of a user speech spoken by a user based on receiving the user speech through the microphone, generate a plurality of candidate reference vectors based on the first reference vector, obtain a plurality of synthesized sounds by inputting the plurality of candidate reference vectors and the plurality of evaluation texts to the TTS model, identify at least one synthesized sound of the plurality of synthesized sounds based on a similarity between characteristics of the plurality of synthesized sounds and the user speech, and store a second reference vector of the at least one synthesized sound in the memory as a reference vector corresponding to the user for the TTS model.

The plurality of candidate reference vectors include at least one from among at least one reference vector randomly selected based on the first reference vector, at least one reference vector generated based on the first reference vector and a third reference vector used for training the TTS model, and at least one reference vector generated by applying a masking vector to the first reference vector.

The processor is further configured to obtain the plurality of synthesized sounds by synthesizing each of the plurality of candidate reference vectors and each of the plurality of evaluation texts.

The processor is further configured to: identify one or more candidate synthesized sounds among the plurality of synthesized sounds having a similarity greater than or equal to a predetermined threshold value to the user speech, and identify the at least one synthesized sound among the one or more candidate synthesized sounds based on at least one of a prosody, a pronunciation, or a sound quality of each of the one or more candidate synthesized sounds.

The processor is further configured to: obtain a prosody score, a pronunciation score, and a sound quality score for each of the one or more candidate synthesized sounds, and identify the at least one synthesized sound of which each of the prosody score, the pronunciation score, and the sound quality score is greater than or equal to respective predetermined threshold values for the prosody score, the pronunciation score and the sound quality score.

The plurality of evaluation texts include at least one evaluation text belonging to each of a plurality of domains, and wherein the processor is further configured to: divide the one or more candidate synthesized sounds according to the plurality of domains based on a domain to which each of the one or more candidate synthesized sounds belongs, and identify the at least one synthesized sound for each domain based on at least one of the prosody, the pronunciation, or the sound quality of each of the one or more candidate synthesized sounds belonging to each domain.

A fourth reference vector of the at least one synthesized sound is stored in the memory according to a first domain to which each of the plurality of evaluation texts belongs.

The electronic apparatus further includes an output interface including at least one of a speaker or a display, and the processor is further configured to: determine a second domain in which the at least one synthesized sound does not exist among the plurality of domains and determine characteristics of a synthesized sound belonging to the second domain in which a prosody score, a pronunciation score and a sound quality score is relatively low, and output a speech requesting the user to speak a sentence generated based on the characteristics of the synthesized sound through the speaker.

The electronic apparatus further includes a speaker, and the processor is further configured to: obtain a text for responding to the user speech of the user based on receiving the user speech through the microphone, obtain a speech for the text based on inputting the text and at least one reference vector corresponding to the user stored in the memory to the TTS model, and control the speaker to output the speech.

The processor is further configured to obtain the reference vector of which a score obtained based on characteristics of the text to be synthesized is highest among one or more reference vectors corresponding to the user stored in the memory.

In accordance with an aspect of the disclosure, there is provided a controlling method of an electronic apparatus including a memory in which a text-to-speech (TTS) model and a plurality of evaluation texts are stored. The method includes: obtaining a first reference vector of a user speech spoken by a user based on receiving the user speech through a microphone; generating a plurality of candidate reference vectors based on the first reference vector; obtaining a plurality of synthesized sounds by inputting the plurality of candidate reference vectors and the plurality of evaluation texts to the TTS model; identifying at least one synthesized sound among the plurality of synthesized sounds based on a similarity between characteristics of the plurality of synthesized sounds and the user speech; and storing a second reference vector of the at least one synthesized sound in the memory as a reference vector corresponding to the user for the TTS model.

The plurality of candidate reference vectors include at least one from among at least one reference vector randomly selected based on the first reference vector, at least one reference vector generated based on the first reference vector and a third reference vector used for training the TTS model, and at least one reference vector generated by applying a masking vector to the first reference vector.

The obtaining the plurality of synthesized sounds includes obtaining the plurality of synthesized sounds by synthesizing each of the plurality of candidate reference vectors and each of the plurality of evaluation texts.

The identifying the at least one synthesized sound includes: identifying one or more candidate synthesized sounds among the plurality of synthesized sounds having a similarity greater than or equal to a predetermined threshold value, to the user speech, and identifying the at least one synthesized sound among the one or more candidate synthesized sounds based on at least one of a prosody, a pronunciation, or a sound quality of each of the one or more candidate synthesized sounds.

The identifying the at least one synthesized sound includes: obtaining a prosody score, a pronunciation score, and a sound quality score for each of the one or more candidate synthesized sounds, and identifying the at least one synthesized sound of which each of the prosody score, the pronunciation score, and the sound quality score is greater than or equal to respective predetermined threshold values for the prosody score, the pronunciation score and the sound quality score.

In addition, according to an embodiment of the disclosure, a system may be configured to minimize the number of sentences requested to be spoken to register the voice of the TTS service and have optimal performance. In addition, according to an embodiment of the disclosure, the personalized TTS service may be provided through a voice of the user without retraining the TTS model for each user.

BRIEF DESCRIPTION OF DRAWINGS

The above and other aspects, features, and advantages of certain embodiments of the present disclosure will be more apparent from the following description taken in conjunction with the accompanying drawings, in which:

FIG. 8D is a view for describing a method of identifying a synthesized sound according to an embodiment;

DETAILED DESCRIPTION

Figure 1:
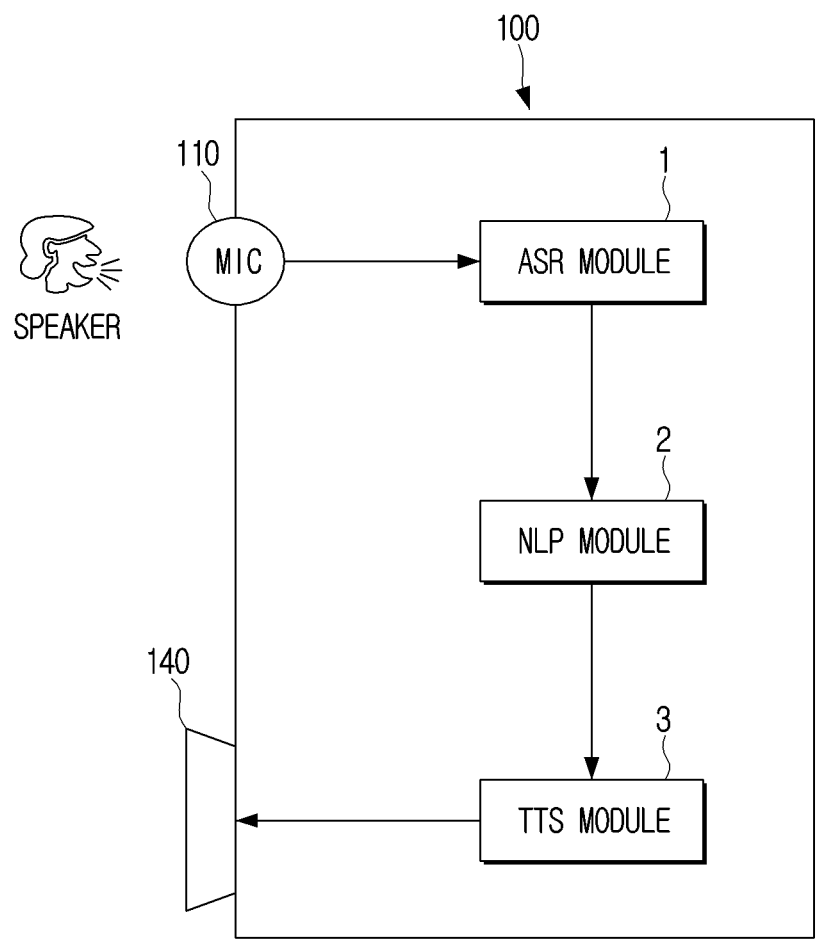
FIG. 1 is view for describing an electronic apparatus according to an embodiment.

In the following disclosure, when it is determined that a detailed description for the known functions or configurations related to the disclosure may unnecessarily obscure the gist of the disclosure, the detailed description therefor will be omitted. In addition, the following embodiments may be modified in several different forms, and the scope and spirit of the disclosure are not limited to the following embodiments. Rather, the disclosure is provided to help those skilled in the art to practice the one or more embodiments of the disclosure, and the one or more embodiments should not be construed as limiting the scope of the disclosure.

It is to be understood that technologies mentioned in the disclosure are not limited to specific embodiments, but include all modifications, equivalents, and/or alternatives according to embodiments of the disclosure. Throughout the accompanying drawings, similar components will be denoted by similar reference numerals.

Expressions "first" or "second" used in the disclosure may indicate various components regardless of a sequence and/or importance of the components, will be used to distinguish one component from the other components, and do not limit these components.

In the disclosure, an expression "A or B", "at least one of A and B", "at least one of A or B", or "one or more of A and/or B", may include all possible combinations of "A" and "B". For example, "A or B", "at least one of A and B", or "at least one of A or B" should be understood as including only A, only B, and both A and B.

In the disclosure, singular forms include plural forms unless the context clearly indicates otherwise. It should be understood that terms "include" or "formed of" used in the disclosure specify the presence of features, numerals, steps, operations, components, parts, or combinations thereof, but do not preclude the presence or addition of one or more other features, numerals, steps, operations, components, parts, or combinations thereof.

When it is mentioned that any component (for example, a first component) is (operatively or communicatively) coupled to or is connected to another component (for example, a second component), it is to be understood that any component is directly coupled to another component or may be coupled to another component through the other component (for example, a third component). On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, in some situations, an expression "apparatus configured to" may mean that the apparatus may "do" together with other apparatuses or components. For example, a phrase "processor configured (or set) to perform A, B, and C" may mean a dedicated processor (for example, an embedded processor) for performing these operations or a generic-purpose processor (for example, a central processing unit (CPU) or an application processor) that may perform these operations by executing one or more software programs stored in a memory device.

FIG. 1 is view for describing an electronic apparatus according to an embodiment.

Referring to FIG. 1, the electronic apparatus 100 according to an embodiment of the disclosure may be implemented as an interactive system.

Here, the electronic apparatus 100 may include, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, a wearable device, or a robot. The wearable device may be implemented as at least one of an accessory-type wearable device (for example, a watch, a ring, a bracelet, an anklet, a necklace, a glasses, a contact lens, or a head-mounted-device (HMD)), a textile or clothing integral-type wearable device (for example, an electronic clothing), a body attachment-type wearable device (for example, a skin pad or a tattoo), or a living body implantation-type wearable device (for example, an implantable circuit). However, these are only some examples, and the electronic apparatus 100 is not limited thereto, and may be implemented as an electronic apparatus having various shapes and purposes.

The interactive system refers to a system capable of interacting with a user through a conversation, such as grasping a user's intention through a user speech and outputting a response corresponding to the user's intention.

According to an embodiment, the electronic apparatus 100 may include an automatic speech recognition (ASR) module 1, a natural language processing (NLP) module 2, and a text to speech (TTS) module 3. In addition, the electronic apparatus 100 may include a microphone 110 for receiving a user speech and an output interface 140 for outputting information responding to the user speech. For example, the output interface 140 may include a speaker for outputting sound.

The ASR module 1 may convert a speech signal (that is, a user speech) received through the microphone 110 into a text (string) such as a word or phoneme sequence using a language model and an acoustic model. The language model may be a model assigning a probability to the word or phoneme sequence, and the acoustic model may be a model indicating a relationship between a speech signal and a text for the speech signal. These models may be configured based on a probability statistics or an artificial neural network.

The NLP module 2 may identify the meaning of words or sentences configuring a text corresponding to the user speech with respect to the text corresponding to the user speech using various analysis methods such as a morphological analysis, a syntactic analysis, and a semantic analysis for the text corresponding to the user speech, grasp a user's intention based on the identified meaning, and obtain response information corresponding to the user's speech. The response information may be in the form of a text.

The TTS module 3 may convert a text into a speech signal and output the speech signal through the output interface 140 (for example, a speaker). That is, the response information obtained by the NLP module 2 may be converted from the form of the text to the form of the speech signal through the TTS module 3.

The electronic apparatus 100 according to an embodiment may provide a personalized TTS service. The personalized TTS service refers to a service that converts (or synthesizes) a text into a speech signal using a speech of an individual user (or another user) through the TTS module 3. To this end, a process of registering the speech of the user in the electronic apparatus 100 in advance may be required. The electronic apparatus 100 according to the disclosure may minimize the number of sentences requested to be spoken by the user to register a voice of the TTS service. In addition, according to an embodiment of the disclosure, the personalized TTS service may be provided through a voice of the user without retraining a TTS model for each user. Specific embodiments thereof will be described in more detail below.

Figure 2:
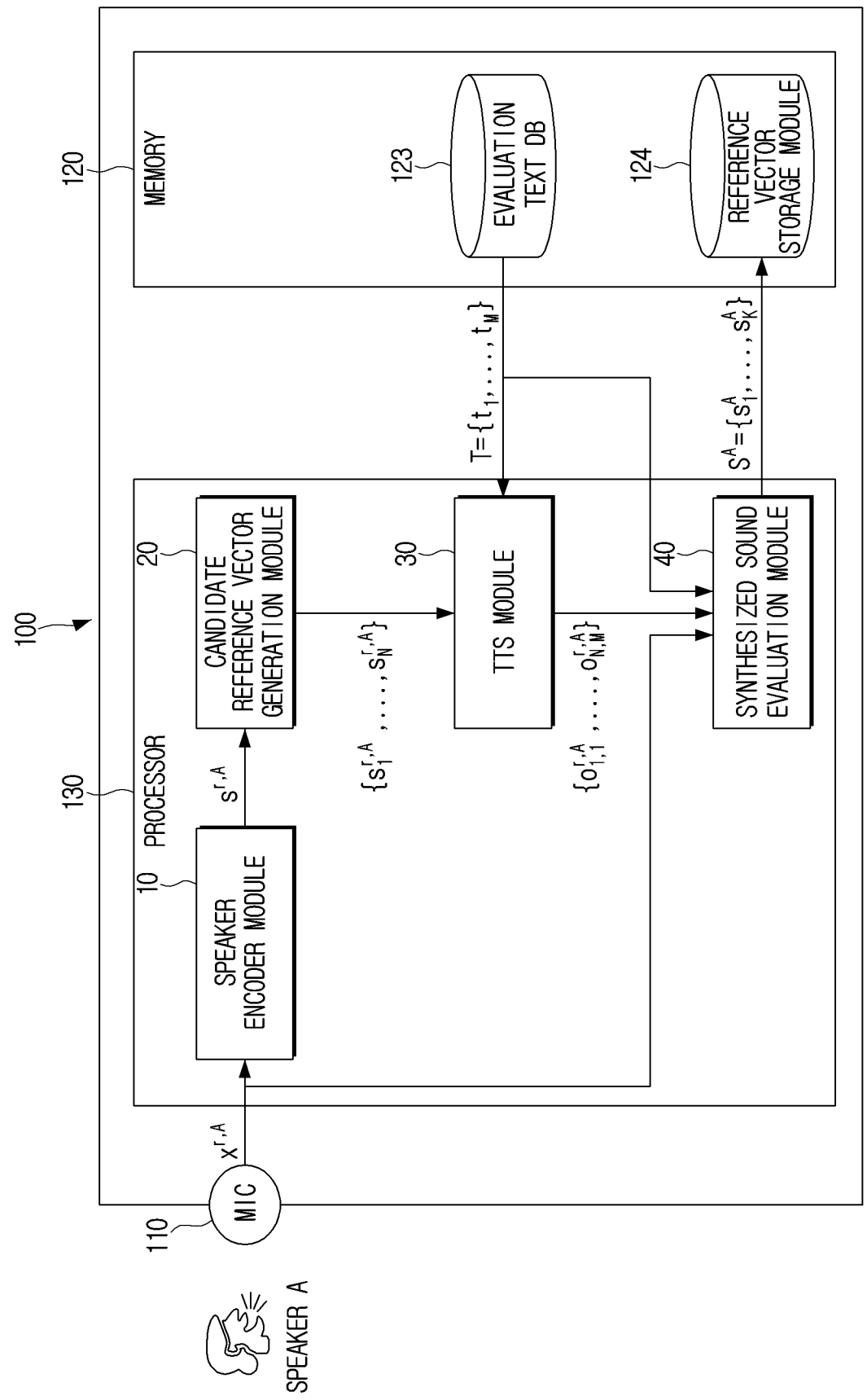
FIG. 2 is a block diagram for describing an operation for each component of the electronic apparatus according to an embodiment.
Figure 3:
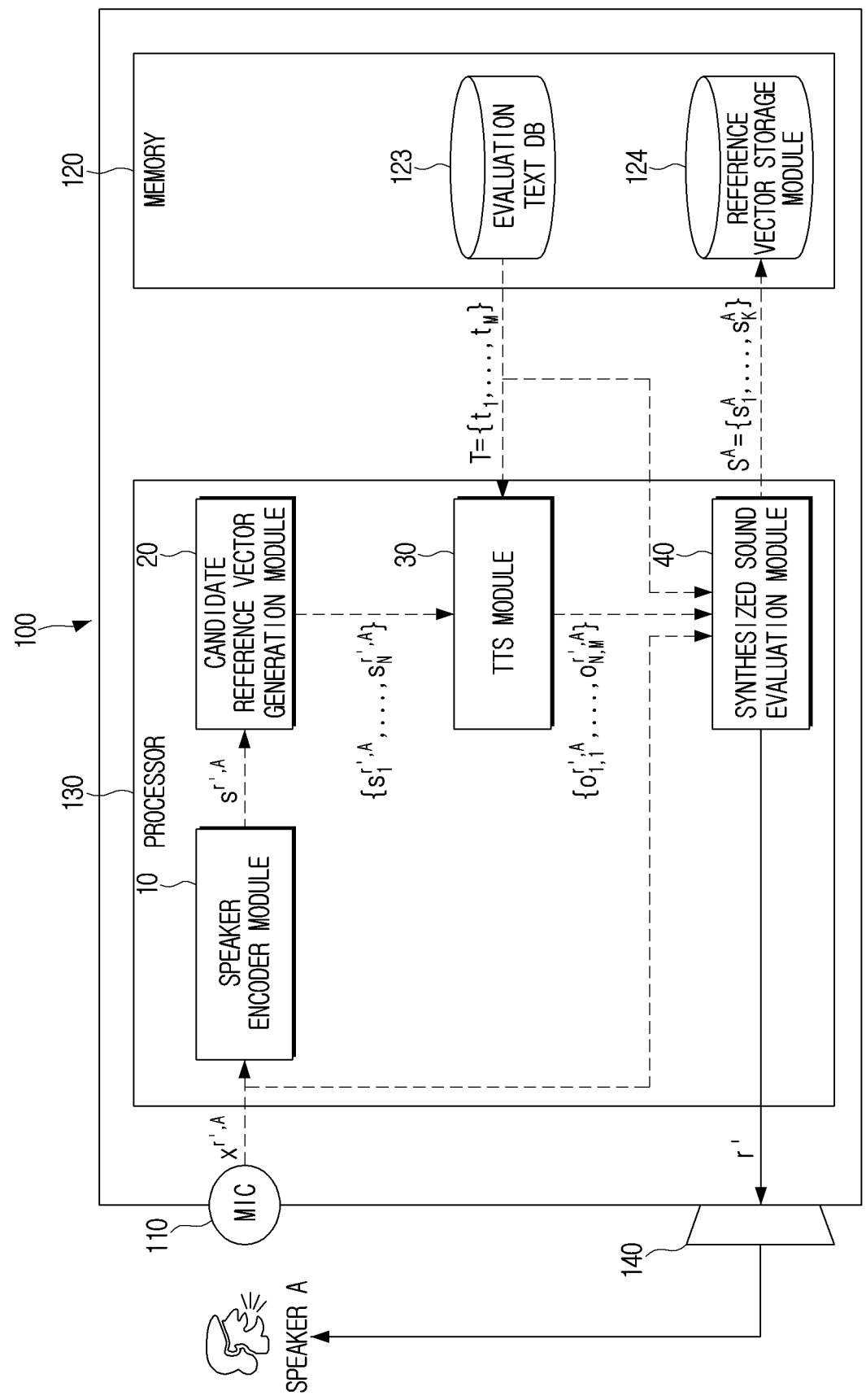
FIG. 3 is a block diagram for describing an operation for each component of the electronic apparatus according to an embodiment.

FIGS. 2 and 3 are block diagrams for describing an operation for each component of the electronic apparatus according to embodiments. FIG. 3 illustrates an operation when a reference vector satisfying an evaluation criterion of at least one evaluation text does not exist.

Referring to FIG. 2, the electronic apparatus 100 according to an embodiment may include a microphone 110, a memory 120, and a processor 130.

The microphone 110 may receive a user speech.

The memory 120 may store a plurality of evaluation texts. For example, the plurality of evaluation texts may be stored in an evaluation text database 123 in the memory 120. A unit of the evaluation text may be one sentence, but this is only an example, and the unit of the evaluation text may be variously modified.

In addition, the memory 120 may store a reference vector of a user registered as a speaker of a TTS module 30. The reference vector of the registered user may be stored in a reference vector storage module 124 in the memory 120 The reference vector of the registered user may indicate a reference vector most matched to a unique speech feature of the registered user.

The processor 130 may extract an optimal reference vector from a speech of the user and register the extracted optimal reference vector as a reference vector of the user, to synthesize a text into the speech of the user.

To this end, the processor 130 may execute instructions included in each of a speaker encoder module 10, a candidate reference vector generation module 20, a TTS module 30, and a synthesized sound evaluation module 40 to perform operations corresponding to each module. Here, the speaker encoder module 10, the candidate reference vector generation module 20, the TTS module 30, and the synthesized sound evaluation module 40 may be stored in the memory 120 or be stored in a memory of the processor 130.

Specifically, when a user speech spoken by user A is received through the microphone 110, the processor 130 may obtain a reference vector of the user speech from the user speech received through the speaker encoder module 10.

For example, when a request (for example, in the form of a touch input, a speech command or the like of the user A) from the user A for user registration of the TTS module 30 is received, the processor 130 may provide a reference text (r) set to be spoken by the user A. Thereafter, when a user speech spoken by the user A is received through the microphone 110, the processor 130 may obtain a reference vector from the user speech received through the speaker encoder module 10. However, this is only an example, and when the user A speaks a natural language without providing the set reference text, it is also possible to recognize the natural language as a reference text.

Here, the reference vector (RV) ($s^{r,A}$) is defined as a multi-dimensional (that, two-dimensional or more) vector (or vector column) of a speech feature appearing in a user speech ($x^{r,A}$) of the user A (speaker A) who has spoken the reference text r. Each dimension (or column) of the reference vector may indicate speech features such as a prosody, a pronunciation, a frequency band, a speaker's age, and a speaker's gender. The reference text refers to a sentence (or a word or the like) spoken by the user, and may be assigned a domain (for example, a reading style, a conversation style, or a news style) according to a speaking method.

An analog acoustic signal received from the microphone 110 may be converted into a digital acoustic signal through an analog-to-digital converter (ADC). Here, the acoustic signal may include the user speech ($x^{r,A}$) of the user A who has spoken the reference text (r). The ADC may be implemented in the microphone 110 or the processor 130, or may be implemented as a separate device. However, the one or more embodiments are not limited thereto, and the ADC may be variously modified.

When the ADC is implemented in the processor 130, the processor 130 may identify an acoustic signal of a section corresponding to the user speech ($x^{r,A}$) from the acoustic signal based on an energy level.

In addition, the processor 130 may divide the acoustic signal of the section corresponding to the user speech ($x^{r,A}$) into in units of frames (for example, 20 ms and 40 ms) and apply a Fourier transform to each frame to calculate a spectrum. Here, the acoustic signal may indicate a waveform expressed in a time domain such as an amplitude (or a sound pressure) over time, and the spectrum may be a waveform expressed in a frequency domain such as an amplitude (or a sound pressure) according to a frequency. For example, the acoustic signal may indicate a waveform in a relationship where a horizontal axis represents time and a vertical axis represents amplitude of acoustic signal, and the spectrum may indicate a waveform in a relationship where a horizontal axis represents frequency and a vertical axis represents amplitude. For example, the spectrum may be a spectrum in a general frequency domain, or may be various types of spectra such as a mel spectrum obtained by applying a filter bank based on a mel scale indicating a relationship between frequencies sensitively perceived by a person to a spectrum and a spectrogram (SPG) having a relationship between a frequency axis and an amplitude axis. In addition, the spectrum may be a cepstrum or a mel cepstrum that may be transformed from the spectrum, and may include a pitch lag or a pitch correlation having pitch/harmonic information. However, these are only some examples, and the spectrum may be various acoustic feature vectors representing features of speech.

In addition, the processor 130 may obtain the reference vector from the spectrum. As an example, the processor 130 may obtain the reference vector ($s^{r,A}$) by inputting the mel spectrum to a speaker recognizer. However, this is only an example, and the processor 130 may obtain the reference vector ($s^{r,A}$) using one of various algorithms (or neural networks) such as cepstrum, linear predictive coefficient (LPC), and filter bank energy, Wav2Vec, SincNet, and PASE. In this case, the obtained reference vector ($s^{r,A}$) may be various types of vectors such as i-vector, d-vector, and x-vector.

A specific method of obtaining the reference vector through the speaker encoder module 10 will be described later with reference to FIG. 5.

In addition, the processor 130 may generate a plurality of candidate reference vectors ($S^A = (s_1^{r,A}, \ldots, s_N^{r,A})$) based on the reference vector ($s^{r,A}$) through the candidate reference vector generation module 20.

Here, the plurality of candidate reference vectors may include one or more reference vectors randomly selected, a reference vector generated based on a first reference vector and a plurality of second reference vectors used for training the TTS module 30, and a reference vector generated by applying a masking vector, or a combination thereof. Specific contents will be described with reference to FIGS. 6A, 6B, and 6C.

Figure 6A:
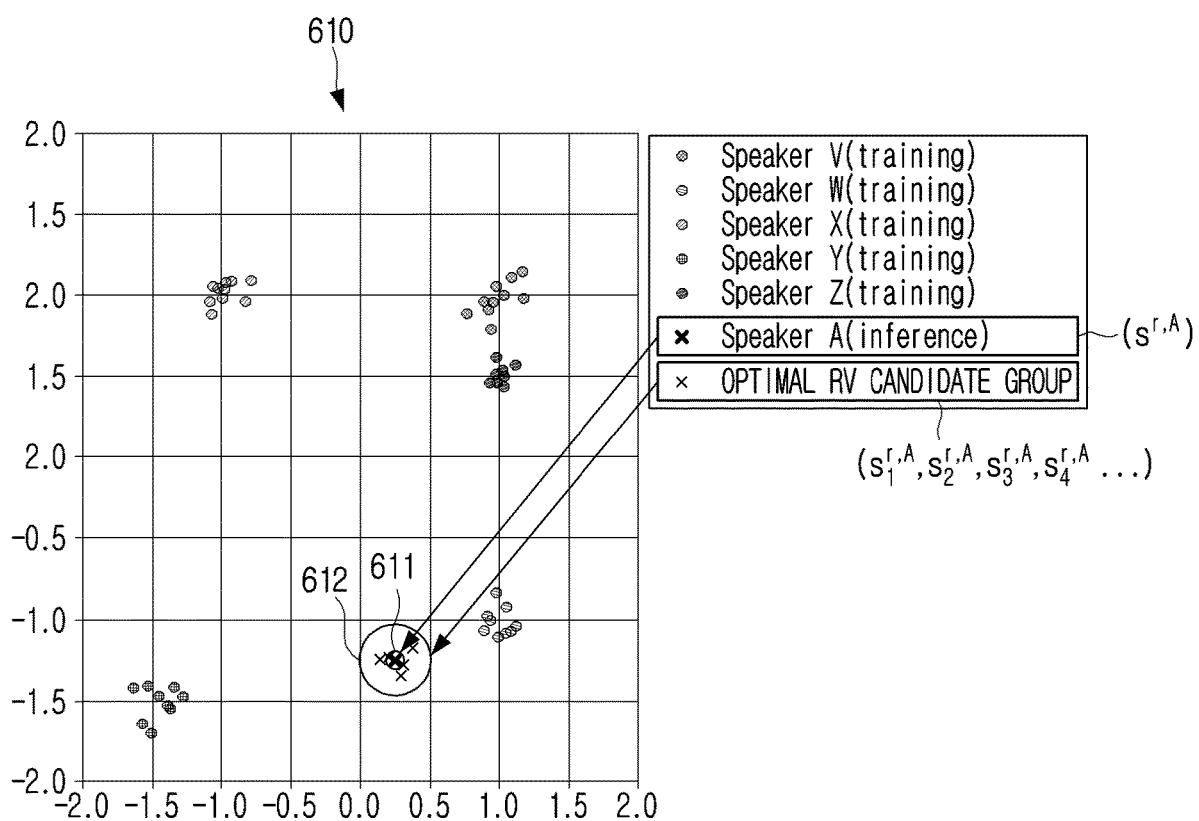
FIG. 6A is a view for describing a method of generating a candidate reference vector according to an embodiment.
Figure 6B:
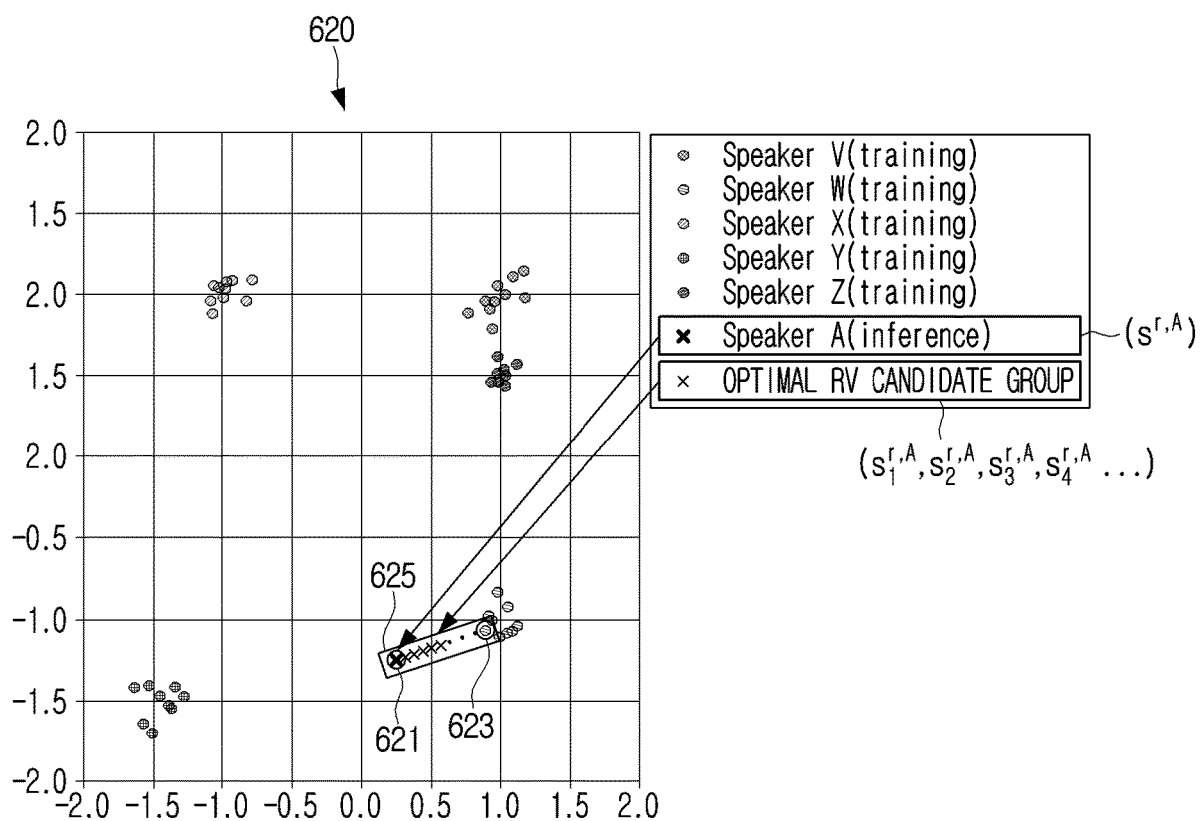
FIG. 6B is a view for describing a method of generating a candidate reference vector according to an embodiment.
Figure 6C:
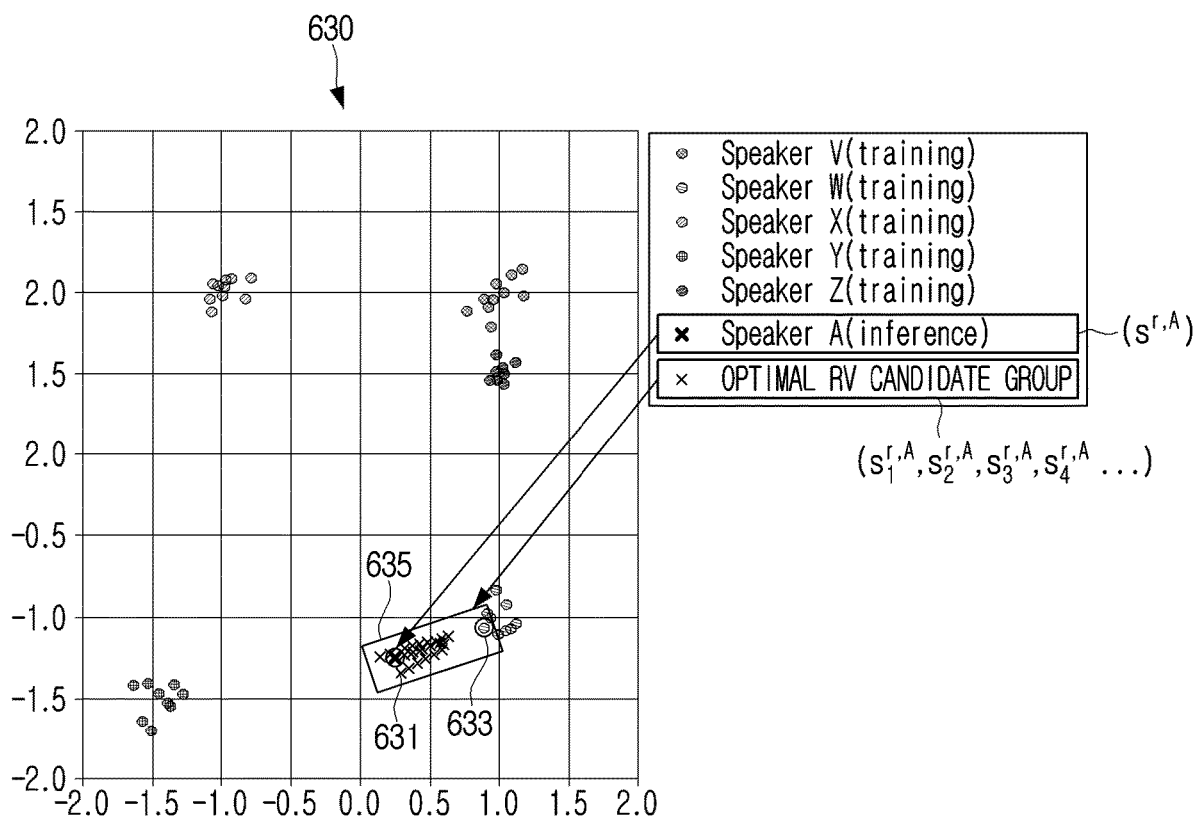
FIG. 6C is a view for describing a method of generating a candidate reference vector according to an embodiment.

FIGS. 6A, 6B, and 6C are views for describing a method of generating a candidate reference vector according to an embodiment. FIGS. 6A, 6B, and 6C represent reference vectors on planes 610, 620, and 630, respectively, and show that the closer the positions of the reference vectors on the planes 610, 620, and 630, the more similar characteristics of the reference vectors.

Referring to FIG. 6A, in a first embodiment, a plurality of candidate reference vectors 612 ($S^{r,A}$) may include at least one reference vector randomly selected based on a reference vector 611 ($s^{r,A}$).

For example, the processor 130 may generate at least one candidate reference vector 612 ($s_n^{r,A}$) by adding a noise to the reference vector 611 ($s^{r,A}$) according to the following Equation 1:

$$s_n^{r,A} = s^{r,A} + \text{noise.} \qquad [\text{Equation 1}]$$

Here, the noise may be a random value that follows a normal distribution, a uniform distribution, or various probability distributions, and may be a value for at least one of dimensions of the reference vector ($s^{r,A}$).

In addition, the noise may have a value within a predetermined range. As illustrated in FIG. 6A, the candidate reference vectors 612 ($s_n^{r,A}$) may be a vector within a predetermined radius from the position of the reference vector 611 ($s^{r,A}$).

Referring to FIG. 6B, in a second embodiment, a plurality of candidate reference vectors 625 ($S^{r,A}$) may include at least one reference vector generated based on a first reference vector 621 ($s^{r,A}$) and one or more second reference vectors used for training the TTS module 30.

For example, the processor 130 may identify a second reference vector 623 (for example, a reference vector $s^B$ of speaker B) having the closest distance from the first reference vector 621, from among the one or more second reference vectors of the plurality of speakers, by comparing distances between the first reference vector ($s^{r,A}$) and the one or more second reference vectors of the plurality of speakers (for example, the reference vector $s^B$ of the speaker B, a reference vector $s^C$ of speaker C, and the like) used for training the TTS module 30.

In addition, the processor 130 may generate at least one candidate reference vector $s_i^{r,A}$ by applying interpolation to the first reference vector ($s^{r,A}$) and the second reference vector 623 (for example, the reference vector $s^B$ of the speaker B) having the closest distance among the second reference vectors used for training the TTS module 30 according to the following Equation 2:

$$s_i^{r,A} = w_a s^{r,A} + w_b s^B. \qquad \text{[Equation 2]}$$

Here, $w_a$ and $w_b$ indicate arbitrary coefficients allowing the candidate reference vector ($s_i^{r,A}$) to be positioned on a function (for example, a linear function or a quadratic function) passing through two reference vectors ($s^{r,A}$ and $s^B$). For example, in a case of the linear function, $w_a$ may be 0.9 and $w_b$ may be 0.1, $w_a$ may be 0.8 and $w_b$ may be 0.2, or $w_a$ may be 0.7 and $w_b$ may be 0.3.

In a third embodiment, a plurality of candidate reference vectors ($S^{r,A}$) may include at least one reference vector generated by applying a masking vector to a reference vector ($s^{r,A}$).

For example, the processor 130 may generate at least one candidate reference vector ($s^{r,A}$) by applying a masking vector W to the reference vector ($s^{r,A}$) according to the following Equation 3:

$$s_m^{r,A} = W s^{r,A}. \qquad \text{[Equation 3]}$$

Here, W is a masking vector, and may be configured as a matrix having 0 or 1, or a value between 0 and 1, or various values.

The plurality of candidate reference vectors ($S^{r,A}$) according to an embodiment may be at least one combination among the first embodiment to third embodiment. That is, the plurality of candidate reference vectors ($S^{r,A}$) may include at least one of at least one reference vector ($s^{r,A}$) randomly selected based on the reference vector ($s^{r,A}$), at least one reference vector generated based on the reference vector ($s^{r,A}$) and a reference vector used for training the TTS module 30, or at least one reference vector generated by applying the masking vector to the reference vector ($s^{r,A}$). For example, a combination of the first embodiment and the second embodiment may appear as illustrated in FIG. 6C.

Referring back to FIGS. 2 and 3, the processor 130 may obtain a plurality of synthesized sounds ($o_{1,1}^{r,A}, \ldots, o_{M,M}^{r,A}$) by inputting a plurality of candidate reference vectors ($S^{r,A}=(s_1^{r,A}, \ldots, s_N^{r,A})$) and a plurality of evaluation texts ($T=t_1, \ldots, t_M$) stored in the memory 120 to the TTS module 30.

Specifically, the processor 130 may obtain a plurality of synthesized sounds ($o_{1,1}^{r,A}, \ldots, o_{N,M}^{r,A}$) generated for each of the plurality of evaluation texts ($t_1, \ldots, t_M$) based on each of the plurality of candidate reference vectors ($s_1^{r,A}, \ldots, s_N^{r,A}$) by inputting the plurality of candidate reference vectors ($S^{r,A}=(s_1^{r,A}, \ldots, s_N^{r,A})$) and the plurality of evaluation texts ($T=t_1, \ldots, t_M$) to the TTS module 30. Here, the generated synthesized sound ($o_{n,m}^{r,A}$) is generated by synthesizing the candidate reference vector ($s_n^{r,A}$) and the evaluation text ($t_m$). When the number of candidate reference vectors is N and the number of evaluation texts is M, the number of synthesized sounds may be N×M.

The plurality of evaluation texts ($t_1, \ldots, t_M$) may include at least one evaluation text belonging to each of a plurality of domains (for example, a reading style, a conversation style, and a news style). That is, a domain may be assigned to each of the plurality of evaluation texts ($t_1, \ldots, t_M$).

For example, the domain may include types such as a reading style, a conversation style, an interrogative sentence, and an exclamatory sentence according to a style of the text, and may include types such as a chatbot, natural language generation (NLG), a news, a dictionary, Wiki, music (a song title, a singer, and lyrics), home appliances (for example, an air conditioner), Bigdata (web crawl content), a fairy tale book, and a novel according to a content of the text. However, these are only some examples, and the domain is not limited thereto, and may be variously modified.

In an embodiment, the TTS module 30 may include an acoustic model (AM) and a voice decoder (vocoder). A detailed description of the TTS module 30 will be described later with reference to FIG. 7.

The acoustic model (AM) may convert a text and a reference vector into an acoustic feature using at least one of various algorithms such as Tacotron, Tacotron 2, Transformer, text2mel, and deep convolutional TTS (DCTTS). The generated acoustic feature may have a reference vector, that is, a feature (for example, a tone, a pitch, an intensity, and a pronunciation) of a corresponding speaker. Here, the acoustic feature may indicate a unique feature (for example, a tone, a pitch, an intensity, and a pronunciation) of a sound in a speech section (for example, a frame unit or a sentence unit). For example, the acoustic feature may be implemented as one of a spectrogram, a mel-spectrogram, a cepstrum, a pitch lag, a pitch correlation, a mel-frequency cepstrum modulation energy (MCME), a mel-frequency cepstral coefficient (MFCC), or the like, in which a waveform and a spectrum are combined with each other, or a combination thereof.

The vocoder may generate synthesized sound by synthesizing the reference vector and the acoustic feature through various algorithms such as WaveNet, Parallel Wavenet, WaveGlow, WaveRNN, and LPCNet. For example, the vocoder may be a neural network-based artificial intelligence model learned to output a synthesized sound when the acoustic feature such as the mel spectrum and the reference vector are input.

In addition, the processor 130 may identify at least one of the plurality of synthesized sounds ($o_{1,1}^{r,A}, \ldots, o_{N,M}^{r,A}$) based on a similarity between the plurality of synthesized sounds ($o_{1,1}^{r,A}, \ldots, o_{N,M}^{r,A}$) and the user speech and characteristics of the plurality of synthesized sounds ($o_{1,1}^{r,A}, \ldots, o_{N,M}^{r,A}$) through the synthesized sound evaluation module 40.

Specifically, the processor 130 may identify a candidate synthesized sound of which a similarity (that is, a speaker similarity) with the user speech ($x^{r,A}$) among the plurality of synthesized sounds ($o_{1,1}^{r,A}, \ldots, o_{N,M}^{r,A}$) is a predetermined threshold value or more (or greater than equal to a predetermined threshold value). Specific descriptions thereof will be described with reference to FIGS. 8A and 8B below. In addition, the processor 130 may identify at least one of the candidate synthesized sounds based on at least one of a prosody, a pronunciation, or a sound quality of each of the candidate synthesized sounds. Specific description thereof will be described with reference to FIGS. 8C and 8D below.

FIGS. 8A to 8D are views for describing a method of identifying a synthesized sound according to an embodiment.

Figure 8A:
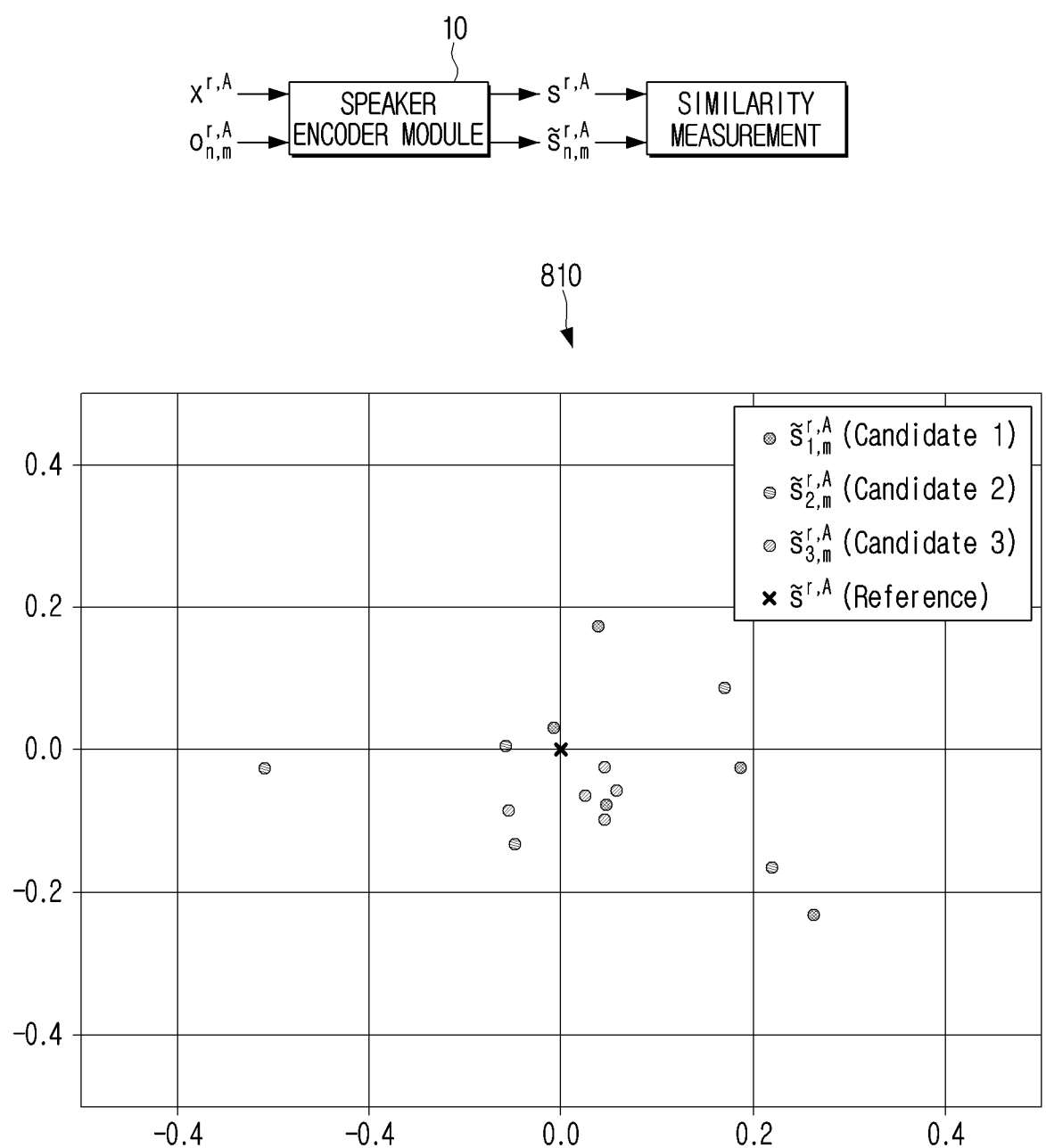
FIG. 8A is a view for describing a method of identifying a synthesized sound according to an embodiment.

Referring to FIG. 8A, when each of the plurality of synthesized sounds ($o_{1,1}^{r,A}, \ldots, o_{N,M}^{r,A}$) is input to the speaker encoder module 10, the processor 130 may obtain reference vectors ($s_{1,1}^{r,A}, \ldots, s_{N,M}^{r,A}$) for the plurality of synthesized sounds ($o_{1,1}^{r,A}, \ldots, o_{N,M}^{r,A}$) each output from the speaker encoder module 10. In addition, the processor 130 may determine a similarity by comparing each of the reference vectors ($s_{1,1}^{r,A}, \ldots, s_{N,M}^{r,A}$) for the plurality of synthesized sounds ($o_{1,1}^{r,A}, \ldots, o_{N,M}^{r,A}$) with the reference vectors ($s^{r,A}$) for the user speech ($x^{r,A}$). Here, the reference vector ($s^{r,A}$) for the user speech ($x^{r,A}$) is output and obtained from the speaker encoder module 10 when the user speech ($x^{r,A}$) is input to the speaker encoder module 10.

Here, the similarity may be calculated through various methods such as a Euclidean distance and a cosine similarity method. In addition, the similarity between reference vectors may be regarded as speaker similarity between the synthesized sounds. That is, the processor 130 may identify a synthesized sound having a reference vector having a similarity of a predetermined threshold value or more among the reference vectors ($s_{1,1}^{r,A}, \ldots, s_{N,M}^{r,A}$) for the plurality of synthesized sounds ($o_{1,1}^{r,A}, \ldots, o_{N,M}^{r,A}$) as a candidate synthesized sound.

The plurality of synthesized sounds ($o_{1,1}^{r,A}, \ldots, o_{N,M}^{r,A}$) may be classified into groups of units of the candidate reference vectors ($s_{1}^{r,A}, \ldots, s_{N}^{r,A}$) used to generate the plurality of synthesized sounds ($o_{1,1}^{r,A}, \ldots, o_{N,M}^{r,A}$). For example, synthesized sounds ($o_{1,1}^{r,A}, \ldots, o_{N,M}^{r,A}$) generated through a first candidate reference vector ($s_{1}^{r,A}$) and first to M-th evaluation texts ($t_{1}, \ldots, t_{M}$) may be classified into the same group. That is, synthesized sounds generated through one candidate reference vector and M evaluation texts may be classified into the same group.

Moreover, the processor 130 may determine a deviation (or a distribution degree) of the reference vectors ($s_{1,1}^{r,A}, \ldots, s_{N,M}^{r,A}$) for the plurality of synthesized sounds ($o_{1,1}^{r,A}, \ldots, o_{N,M}^{r,A}$) in group units. The processor 130 may identify reference vectors of a group having the smallest deviation. In this case, the processor 130 may identify synthesized sounds synthesized through the reference vectors of the group having the smallest deviation as candidate synthesized sounds.

For example, a case where first group to third group (i.e., Candidate 1 to Candidate 3) are positioned in a plane 810 of FIG. 8A. When the synthesized sounds ($o_{1,1}^{r,A}, \ldots, o_{N,M}^{r,A}$) generated through the first candidate reference vector ($s_{1}^{r,A}$) and the first to M-th evaluation texts ($t_{1}, \ldots, t_{M}$) are classified into the first group ($s_{1,m}^{r,A}$), synthesized sounds ($o_{2,1}^{r,A}, \ldots, o_{2,M}^{r,A}$) generated through a second candidate reference vector ($s_{2}^{r,A}$) and the first to M-th evaluation texts ($t_{1}, \ldots, t_{M}$) are classified into the second group ($s_{2,m}^{r,A}$), and synthesized sounds ($o_{3,1}^{r,A}, \ldots, o_{3,M}^{r,A}$) generated through a third candidate reference vector ($s_{3}^{r,A}$) and the first to M-th evaluation texts ($t_{1}, \ldots, t_{M}$) are classified into the third group ($s_{3,m}^{r,A}$). In this case, the processor 130 may identify a reference vector ($s_{3}^{r,A}$) of the third group ($s_{3,m}^{r,A}$) having the smallest deviation based on the reference vector ($s^{r,A}$) for the user speech ($x^{r,A}$). In this case, the processor 130 may identify synthesized sounds ($o_{3,1}^{r,A}, \ldots, o_{3,M}^{r,A}$) synthesized through the reference vector ($s_{3}^{r,A}$) of the third group ($s_{3,m}^{r,A}$) as candidate synthesized sounds.

Figure 8B:
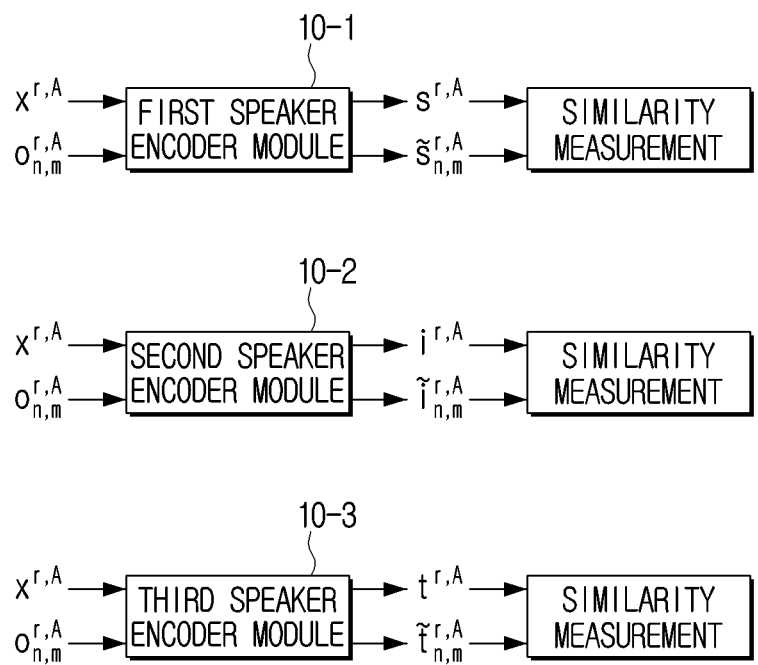
FIG. 8B is a view for describing a method of identifying a synthesized sound according to an embodiment.

Referring to FIG. 8B, the processor 130 according to an embodiment may identify candidate synthesized sounds using a plurality of speaker encoder modules 10-1 to 10-3. For example, a first encoder module 10-1 to a third speaker encoder module 10-3 may include different models to output different types of reference vectors (for example, i-vector, d-vector, x-vector, and the like).

When the plurality of synthesized sounds ($o_{1,1}^{r,A}, \ldots, o_{N,M}^{r,A}$) and the user speech ($x^{r,A}$) are input to the first speaker encoder module 10-1, the processor 130 may obtain first reference vectors ($s_{1,1}^{r,A}, \ldots, s_{N,M}^{r,A}$) for the plurality of synthesized sounds ($o_{1,1}^{r,A}, \ldots, o_{N,M}^{r,A}$) output from the first speaker encoder module 10-1 and a first reference vector ($s^{r,A}$) for the user speech ($x^{r,A}$), and compare the first reference vectors ($s_{1,1}^{r,A}, \ldots, s_{N,M}^{r,A}$) and the first reference vector ($s^{r,A}$) with each other to determine a first similarity.

When the plurality of synthesized sounds ($o_{1,1}^{r,A}, \ldots, o_{N,M}^{r,A}$) and the user speech ($x^{r,A}$) are input to the second speaker encoder module 10-2, the processor 130 may obtain second reference vectors ($i_{1,1}^{r,A}, \ldots, i_{N,M}^{r,A}$) for the plurality of synthesized sounds ($o_{1,1}^{r,A}, \ldots, o_{N,M}^{r,A}$) output from the second speaker encoder module 10-2 and a second reference vector ($i^{r,A}$) for the user speech ($x^{r,A}$), and compare the second reference vectors ($i_{1,1}^{r,A}, \ldots, i_{N,M}^{r,A}$) and the second reference vector ($i^{r,A}$) with each other to determine a second similarity.

When the plurality of synthesized sounds ($o_{1,1}^{r,A}, \ldots, o_{N,M}^{r,A}$) and the user speech ($x^{r,A}$) are input to the third speaker encoder module 10-3, the processor 130 may obtain third reference vectors ($t_{1,1}^{r,A}, \ldots, t_{N,M}^{r,A}$) for the plurality of synthesized sounds ($o_{1,1}^{r,A}, \ldots, o_{N,M}^{r,A}$) output from the third speaker encoder module 10-3 and a third reference vector ($t^{r,A}$) for the user speech ($x^{r,A}$), and compare the third reference vectors ($t_{1,1}^{r,A}, \ldots, t_{N,M}^{r,A}$) and the third reference vector ($t^{r,A}$) with each other to determine a third similarity.

In addition, the processor 130 may identify a reference vector having the optimal performance among the first to third similarities, and may identify synthesized sounds synthesized through the identified reference vector as candidate synthesized sounds. The reference vector having the optimal performance may be a vector having the smallest deviation value or a vector exceeding a predetermined threshold value for each of the first to third similarities.

In addition, the processor 130 may identify at least one of the candidate synthesized sounds based on at least one of a prosody, a pronunciation, or a sound quality of each of the candidate synthesized sounds. That is, the processor 130 may identify the synthesized sound through one of a prosody, a pronunciation, and a sound quality of each of the candidate synthesized sounds, or a combination thereof.

Specifically, the processor 130 may calculate a prosody score, a pronunciation score, and a sound quality score of each of the candidate synthesized sounds, and identify at least one synthesized sound of which each of the prosody score, the pronunciation score, and the sound quality score is a predetermined threshold value or more among the candidate synthesized sounds.

As an example, the processor 130 may calculate the prosody score of each of the candidate synthesized sounds, and identify at least one synthesized sound of which the prosody score is a predetermined threshold value or more. For example, the processor 130 may calculate the prosody score by comparing a length, a speaking speed, and a pitch contour indicating a pitch over time for each phoneme set in the evaluation text $t_m$ with a length, a speaking speed, and a pitch contour for each phoneme of the candidate synthesized sound $o_{n,m}^{r,A}$ corresponding to the evaluation text $t_m$.

As an example, the processor 130 may calculate the pronunciation score of each of the candidate synthesized sounds, and identify at least one synthesized sound of which the pronunciation score is a predetermined threshold value or more.

Figure 8C:
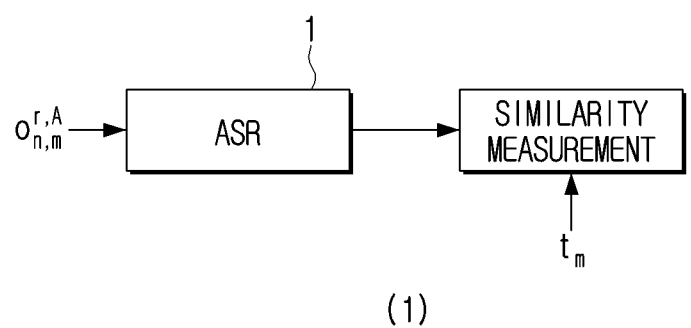
FIG. 8C is a view for describing a method of identifying a synthesized sound according to an embodiment.
Figure 8C:
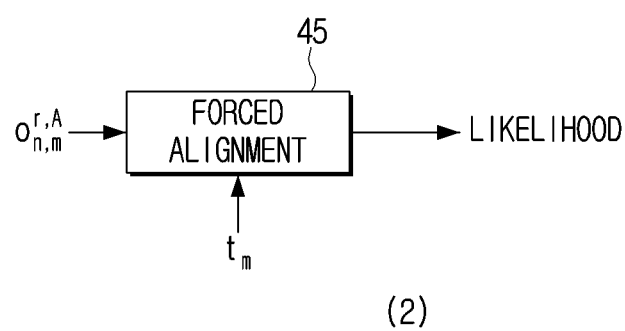

As illustrated in (1) of FIG. 8C, the processor 130 according to an embodiment may input the synthesized sound $o_{n,m}^{r,A}$ to the ASR module 1 to obtain a text, and compare the obtained text with the evaluation text $t_m$ corresponding to the synthesized sound $o_{n,m}^{r,A}$ to calculate the pronunciation score. The ASR module 1 may analyze the speech using various algorithms and convert contents of the speech into a text format.

As illustrated in (2) of FIG. 8C, the processor 130 according to an embodiment may input the synthesized sound $o_{n,m}^{r,A}$ to a forced alignment module 45 to identify boundaries between speech-phoneme and speech-word, and compare the identified boundaries with boundaries between speech-phoneme and speech-word in the evaluation text $t_m$ corresponding to the synthesized sound $o_{n,m}^{r,A}$ to calculate a likelihood. Here, the likelihood may be determined as the pronunciation score.

As an example, the processor 130 may calculate the sound quality score of each of the candidate synthesized sounds, and identify at least one synthesized sound of which the sound quality score is a predetermined threshold value or more.

For example, the processor 130 may calculate the sound quality score for the synthesized sound $o_{n,m}^{r,A}$ through various algorithms such as a signal-to-noise ratio (SNR), a harmonic-to-noise ratio (HNR), and sound quality evaluation through room characteristic estimation.

In addition, the processor 130 may divide the plurality of candidate synthesized sounds according to a plurality of domains based on a domain to which each of the plurality of candidate synthesized sounds belongs (that is, a domain of an evaluation text used to generate the corresponding synthesized sound). The processor 130 may identify at least one synthesized sound for each domain based on at least one of a similarity, a prosody, a pronunciation, or a sound quality of each of one or more candidate synthesized sounds belonging to each domain.

Specifically, an embodiment in which the synthesized sound evaluation module 40 selects an optimal reference vector based on a similarity between the plurality of synthesized sounds $(o_{1,1}^{r,A}, \ldots, o_{N,M}^{r,A})$ and the user speech and characteristics of the plurality of synthesized sounds $(o_{1,1}^{r,A}, \ldots, o_{N,M}^{r,A})$ will be described with reference to FIG. 8.

In tables of (1) to (4) of FIG. 8D, each row indicates an evaluation text $(t_1, t_2, t_3, \ldots)$ to which each domain is assigned, and each column indicates a candidate reference vector $(s_1^{r,A}, s_2^{r,A}, s_3^{r,A}, s_4^{r,A}, \ldots)$. A combination of each row and column indicates scores (a speaker similarity, a prosody score, a pronunciation score, a sound quality score, and the like) of synthesized sounds generated according to a combination of the evaluation text and the candidate reference vector.

As an embodiment, as illustrated in (1) of FIG. 8D, when all of speaker similarities (that is, values in the same column) of a plurality of synthesized sounds in which one candidate reference vector and a plurality of evaluation texts are combined with each other are a predetermined value (for example, 60) or more, it may be determined that the corresponding candidate reference vector satisfies an evaluation criterion for the speaker similarity, and when at least one of the speaker similarities is less than the predetermined value (for example, 60), it may be determined that the corresponding candidate reference vector does not satisfy the evaluation criterion for the speaker similarity.

As an embodiment, as illustrated in (2) of FIG. 8D, when at least one of prosody scores of a plurality of synthesized sounds in which one candidate reference vector and a plurality of evaluation texts are combined with each other is a predetermined value (for example, 80) or more, it may be determined that the corresponding candidate reference vector satisfies an evaluation criterion for the prosody score, and when all of the prosody scores of a plurality of synthesized sounds are less than the predetermined value (for example, 80), it may be determined that the corresponding candidate reference vector does not satisfy the evaluation criterion for the prosody score.

As an embodiment, as illustrated in (3) of FIG. 8D, when at least one of pronunciation scores of a plurality of synthesized sounds in which one candidate reference vector and a plurality of evaluation texts are combined with each other is a predetermined value (for example, 90) or more, it may be determined that the corresponding candidate reference vector satisfies an evaluation criterion for the pronunciation score, and when all of the pronunciation scores of a plurality of synthesized sounds are less than the predetermined value (for example, 90), it may be determined that the corresponding candidate reference vector does not satisfy the evaluation criterion for the pronunciation score.

As an embodiment, as illustrated in (4) of FIG. 8D, when all of sound quality scores (that is, values in the same column) of a plurality of synthesized sounds in which one candidate reference vector and a plurality of evaluation texts are combined with each other are a predetermined value (for example, 80) or more, it may be determined that the corresponding candidate reference vector satisfies an evaluation criterion for the sound quality score, and when at least one of the sound quality scores is less than the predetermined value (for example, 80), it may be determined that the corresponding candidate reference vector does not satisfy the evaluation criterion for the sound quality score.

In addition, the processor 130 may store a reference vector $(s_1^A, \ldots, s_K^A)$ of the identified at least one synthesized sound in the memory 120 as a reference vector $(S^A = (s_1^A, \ldots, s_K^A))$ corresponding to the user A for the TTS module 30. That is, a reference vector satisfying the evaluation criterion among the plurality of candidate reference vectors may be registered as a reference vector of the user A and be stored in the reference vector storage module 124 of the memory 120 in FIG. 2.

As described above, the electronic apparatus 100 according to an embodiment may obtain reference vectors optimized for various texts with only reference vectors obtained through a small number of texts even though the user speaks the small number of texts (for example, one to five words) based on reference vectors of the same user having a distribution within a predetermined range. That is, unlike the related art, the electronic apparatus 100 may ensure quality speech detection performance through synthesized sound evaluation, and may obtain a plurality of reference vectors from a spoken text or word even though the user speaks the text only once. Because the number of texts spoken to provide the personalized TTS service is very small, the speed and convenience of the user registering the personalized TTS service may be improved.

The electronic apparatus 100 according to an embodiment may provide feedback to the user A when it is not enough to provide the personalized TTS service with only the user speech spoken by the user A in a process of registering the reference vector as a reference vector of the user A.

Taking FIG. 8D as an example, the reference vectors of the candidate synthesized sounds satisfying the speaker similarity of the predetermined value (for example, 60) or more for all evaluation texts may be identified as $s_3^{r,A}$, $s_4^{r,A}$ the reference vectors of the candidate synthesized sounds satisfying the prosody score of the predetermined value (for example, 80) or more for at least one evaluation text may be identified as $s_2^{r,A}, s_3^{r,A}, s_4^{r,A}$, the reference vectors of the candidate synthesized sounds satisfying the pronunciation score of the predetermined value (for example, 90) or more for at least one evaluation text may be identified as $s_1^{r,A}$, $s_3^{r,A}, s_4^{r,A}$, and the candidate reference vectors of the candidate synthesized sounds satisfying the sound quality score of the predetermined value (for example, 80) or more for all evaluation texts may be identified as $s_2^{r,A}, s_3^{r,A}, s_4^{r,A}$.

In this case, the processor 130 may store the reference vectors ($s_3^{r,A}, s_4^{r,A}$) of the identified candidate synthesized sounds satisfying all evaluation criteria through the synthesized sound evaluation module 40 in the reference vector storage module 124 of the memory 120 as the reference vectors corresponding to the user A.

In addition, the processor 130 may divide the plurality of candidate synthesized sounds according to the plurality of domains based on the domain to which each of the plurality of candidate synthesized sounds belongs. Here, the candidate synthesized sounds ($o_{3,1}^{r,A}$, $o_{3,2}^{r,A}$, . . . , $o_{4,1}^{r,A}$, $o_{4,2}^{r,A}$, . . . ) may be generated through a combination of the reference vectors ($s_3^{r,A}, s_4^{r,A}$) and the plurality of evaluation texts ($t_1, t_2, t_3, \ldots$), and the domains to which the candidate synthesized sounds ($o_{3,1}^{r,A}$, $o_{3,2}^{r,A}$, . . . , $o_{4,1}^{r,A}$, $o_{4,2}^{r,A}$, . . . ) belong may be domains assigned to the evaluation texts ($t_1, t_2, t_3, \ldots$) used to generate the candidate synthesized sounds.

In addition, the processor 130 may identify at least one synthesized sound for each domain based on at least one of the speaker similarity, the prosody, the pronunciation, or the sound quality of each of one or more candidate synthesized sounds belonging to each domain. In addition, the reference vectors of the identified at least one synthesized sound may be stored in the memory 120 according to the domain to which each evaluation text belongs.

Specifically, the processor 130 may determine whether or not a synthesized sound satisfying an evaluation criterion (for example, a speaker similarity, a prosody, a pronunciation, and a sound quality) exists for a specific domain.

For example, as illustrated in FIG. 8D, the processor 130 may identify a candidate synthesized sound generated according to a combination of an evaluation text $t_1$ and a reference vector $s_4^{r,A}$ as a candidate synthesized sound of which a prosody score and a pronunciation score satisfy predetermined values. In addition, the processor 130 may identify a candidate synthesized sound generated according to a combination of an evaluation text $t_2$ and a reference vector $s_3^{r,A}$ as a candidate synthesized sound of which a prosody score and a pronunciation score satisfy predetermined values. In this case, the processor 130 may evaluate (select) the reference vector $s_4^{r,A}$ satisfying a prosody score and a pronunciation score of the evaluation text $t_1$ as a reference vector that may cover a domain of the evaluation text $t_1$. In addition, the processor 130 may evaluate (select) the reference vector $s_3^{r,A}$ satisfying a prosody score and a pronunciation score of the evaluation text $t_2$ as a reference vector that may cover a domain of the evaluation text $t_2$.

Referring to FIG. 3, the processor 130 may control the output interface 140 (see also FIG. 9B) to output information requesting speaking of a sentence (r') belonging to the specific domain, when at least one synthesized sound satisfying the evaluation criterion (for example, at least one of the speaker similarity, the prosody, the pronunciation, or the sound quality) does not exist for the specific domain through the synthesized sound evaluation module 40.

For example, as illustrated in FIG. 8D, the processor 130 may provide a feedback sentence (r') belonging to a domain assigned to an evaluation text $t_3$ to the user when a synthesized sound (or a reference vector) satisfying a prosody score and a pronunciation score of the evaluation text $t_3$ does not exist. Here, the feedback sentence (r') may include a sentence, a word or the like inquiring the user to speak a speech to cover a domain of the evaluation text $t_3$. For example, if the evaluation text $t_3$ is a news domain, the feedback sentence (r') may be $t_3$ or a news domain text.

For example, the processor 130 may determine at least one candidate synthesized sound belonging to a domain in which at least one synthesized sound does not exist among the plurality of domains, and determine characteristics of a synthesized sound of which a relatively low score of a prosody, a pronunciation, and a sound quality is calculated based on a prosody score, a pronunciation score, and a sound quality score calculated for the determined candidate synthesized sound. The processor 130 may output a speech requesting the user to speak a sentence generated based on the determined characteristic through the speaker 141.

As described above, the electronic apparatus 100 according to the one or more embodiments may perform evaluation according to various evaluation criteria in a process of registering the speech of the user as the speech of the TTS module 30. A reference vector having optimal performance may be determined as the reference vector of the user. In addition, reference vectors that may cover various types of texts may be obtained by providing the feedback to the user when it is not sufficient to provide the personalized TTS service with only the user speech spoken by the user.

Moreover, the electronic apparatus 100 may synthesize a speech signal using the registered user speech after the user speech is registered in the TTS module 30. This will be described in detail with reference to FIG. 4.

Figure 4:
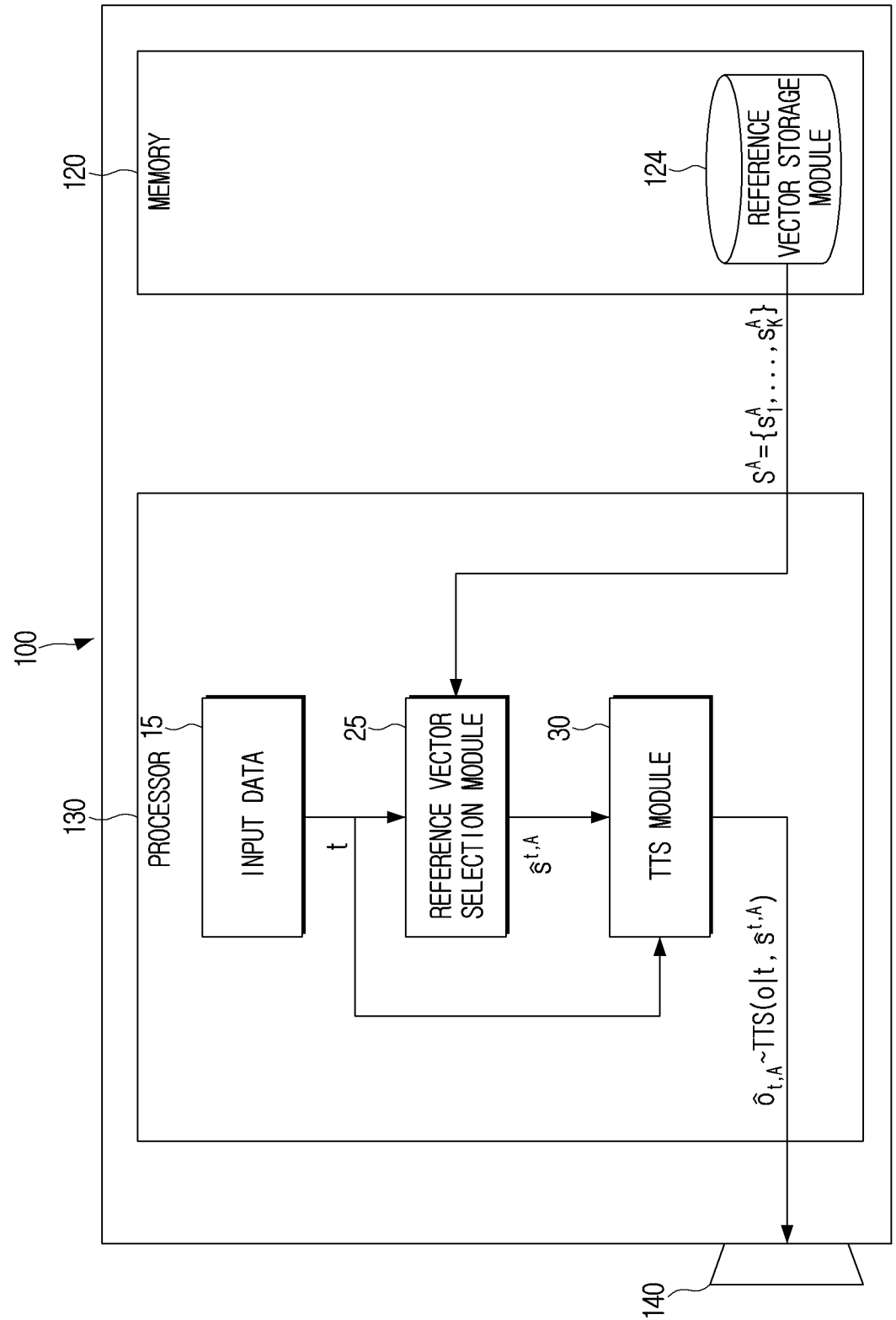
FIG. 4 is a block diagram for describing an operation for each component of the electronic apparatus according to an embodiment.

FIG. 4 is a block diagram for describing an operation for each component of the electronic apparatus according to an embodiment of the disclosure. FIG. 4 illustrates a process of synthesizing a speech signal using a user speech after the user speech is registered in a TTS module 30.

Referring to FIG. 4, an input data 15 (for example, a text t) is provided to the processor 130. The input data 15 may be a text t obtained as a result of performing speech recognition on a user speech. Alternatively, the input data 15 may be a text t input through an input device (for example, a keyboard, a touch screen or the like).

For example, when a user speech of the user is received through the microphone 110, the processor 130 may obtain a text t in response to the user speech. Here, the text t may be obtained through the ASR module 1 and the NLP module 2.

The processor 130 may select a reference vector belonging to a domain of the text t among one or more reference vectors $S^A$ corresponding to the user A stored in the reference vector storage module 124 of the memory 120, through a reference vector selection module 25.

Here, when a plurality of reference vectors belonging to the domain of the text t are selected, the processor 130 may obtain a reference vector of a synthesized sound of which a score (for example, a prosody score or a pronunciation score) calculated based on characteristics of a synthesized sound synthesized with an evaluation text belonging to the domain of the text t is the highest among the plurality of reference vectors. The score calculated based on the characteristics of the synthesized speech synthesized with the evaluation text belonging to the domain of the text t may be stored in the memory 120 in a process of registering the user speech of the user A.

For example, assuming that a reference vector of a synthesized sound having the highest score among synthesized sounds synthesized with an evaluation text belonging to a reading style is $s_1^A$ and a reference vector of a synthesized sound having the highest score among synthesized sounds synthesized with an evaluation text belonging to a conversation style is $s_2^A$, when the domain of the text t, which is the input data 15, is the reading style, the reference vector $s_1^A$ of the stored one or more reference vector $S^A$ corresponding to the user A may be selected as a reference vector ($\hat{s}^{r,A}$) belonging to the domain of the text t. The processor 130 may select $\hat{s}^{r,A}$ having optimum performance for the given text t using an arbitrary statistical model (e.g., Deep Neural Network (DNN), Hidden Markov Model (HMM), Gaussian Mixture Model (GMM), or the like).

In addition, the processor 130 may input the text t, which is the input data 15, and the selected reference vector ($\hat{s}^{r,A}$) to the TTS module 30 to obtain a speech generated for the text t based on the reference vector ($\hat{s}^{r,A}$).

The processor 130 may control a speaker 141 (see FIG. 9B) to output the obtained speech.

Figure 5:
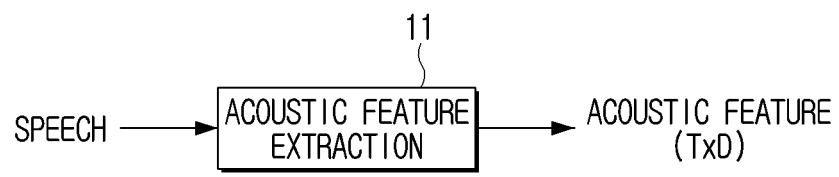
FIG. 5 is a view for describing a method of obtaining a reference vector according to an embodiment.
Figure 5:
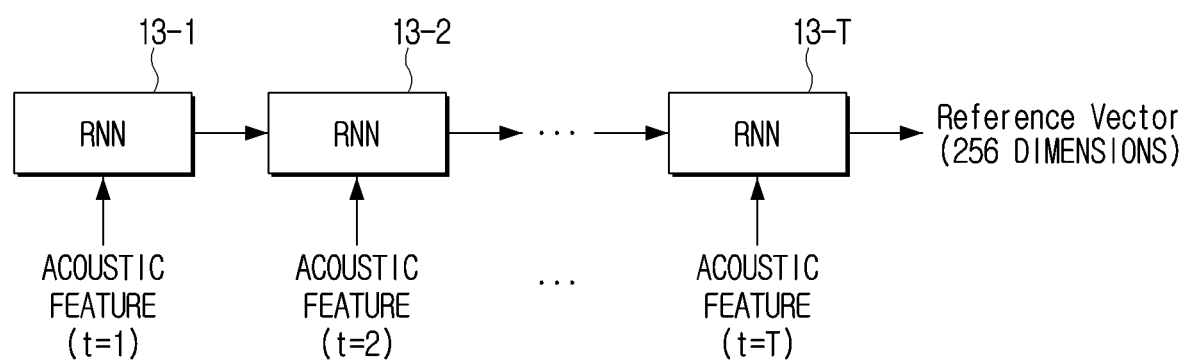

FIG. 5 is a view for describing a method of obtaining a reference vector according to an embodiment.

The speaker encoder module 10 may obtain a reference vector through the user speech. Here, the speaker encoder module 10 may include various types of modules such as a reference encoder, a global style token (GST), a variable autoencoder (VAE), an I-vector, and a neural network module.

According to an embodiment, the speaker encoder module 10 may include an acoustic feature extractor 11 and recurrent neural network (RNN) modules 13-1 to 13-T.

The acoustic feature extractor 11 may extract an acoustic feature in units of frames. A dimension of the acoustic feature may be represented as (T×D). For example, when one frame is 10 ms and an 80-dimensional acoustic feature is extracted, if a speech waveform of 3 seconds is input, T is 300 and D is 80, such that an acoustic feature of (300×80) may be output. In general, the acoustic feature is fixed at the time of designing the TTS module 30, and accordingly, D may have a fixed value regardless of a speech input.

The RNN modules 13-1 to 13-T may output a vector of a fixed dimension regardless of T. For example, assuming that the reference vector is 256 dimensions, the RNN modules 13-1 to 13-T may output a vector of 256 dimensions regardless of T and D. The reference vector may be output in a state in which prosody or tone information (global information) rather than phoneme information (local information) included in the corresponding speech is compressed. In this case, the last state of the RNN modules 13-1 to 13-T may be used as the reference vector.

Figure 7:
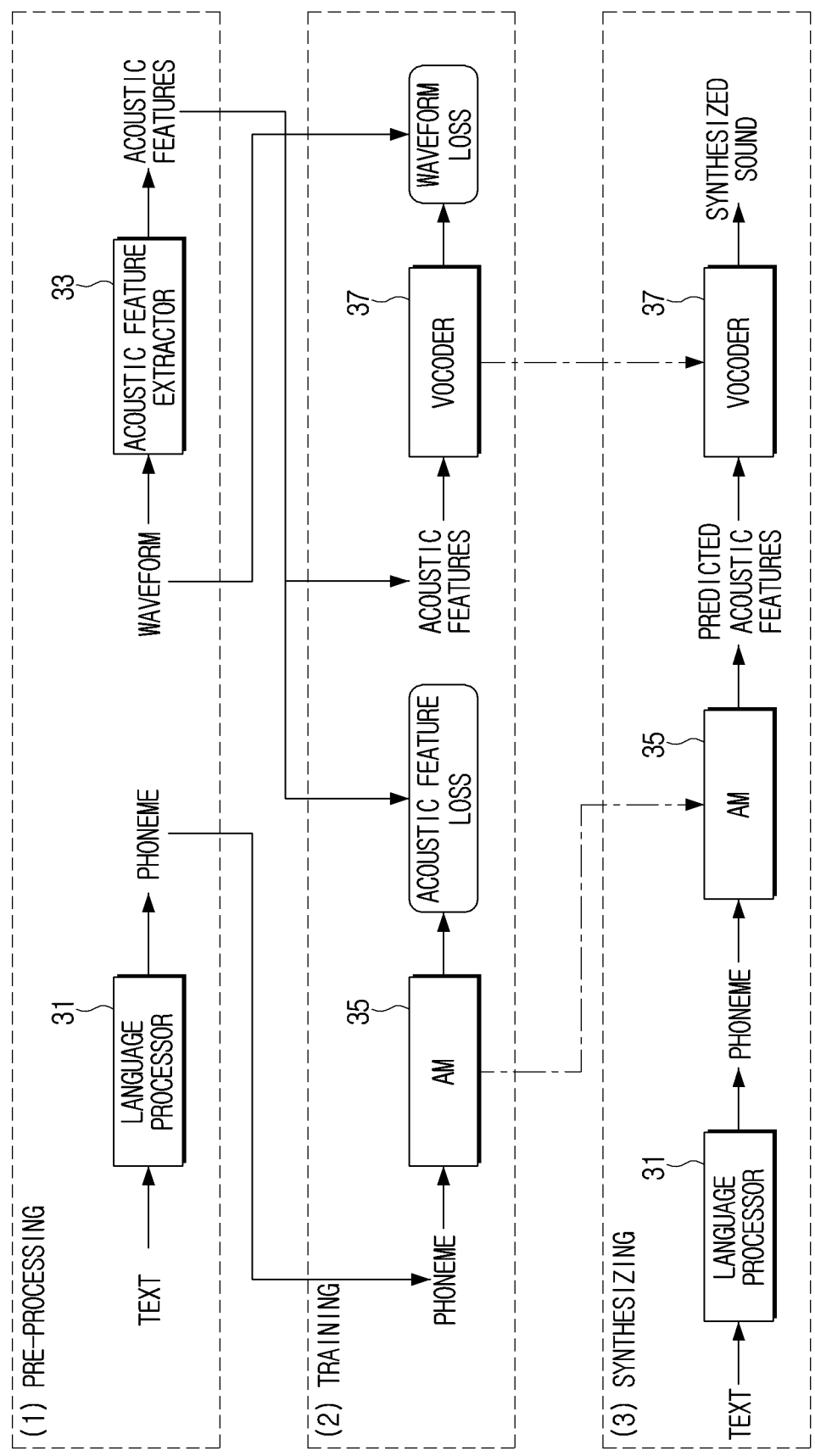
FIG. 7 is a view for describing a text to speech (TTS) model according to an embodiment.

FIG. 7 is a view for describing a TTS model according to an embodiment.

Referring to FIG. 7, the TTS module 30 according to an embodiment may perform pre-processing on a text and a speech waveform through a language processor 31 and an acoustic feature extractor 33 to extract a phoneme and acoustic features, and train a neural network-based acoustic model (AM) 35 and a vocoder 37 using the pre-processed phoneme and acoustic features as learning data.

Thereafter, the TTS module 30 may extract a phoneme from the text through the language processor 31, input the extracted phoneme to the learned AM 35 to obtain an expected acoustic feature as an output, and input the obtained acoustic feature to the learned vocoder 37 to obtain a synthesized sound as an output.

However, the embodiment described above is only an example, and the one or more embodiments of the disclosure is not limited thereto and may be variously modified.

Figure 9A:
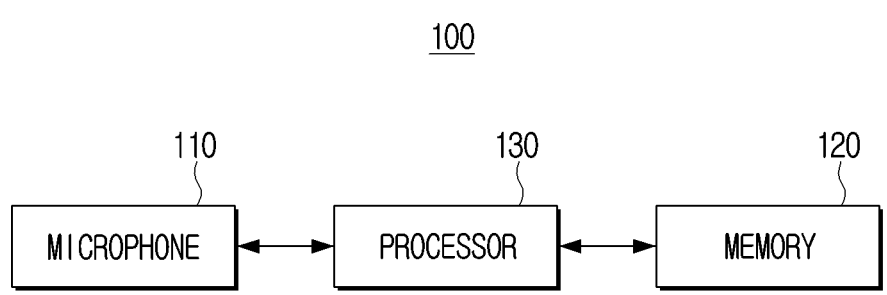
FIG. 9A is a view for describing hardware components of the electronic apparatus according to an embodiment.

FIG. 9A is a view for describing hardware components of the electronic apparatus according to an embodiment.

Referring to FIG. 9A, the electronic apparatus 100 according to an embodiment may include a microphone 110, a memory 120, and a processor 130.

The microphone 110 may receive an analog acoustic signal. The microphone 110 may receive an acoustic signal including a user speech. The acoustic signal may be a sound wave having information such as frequency and amplitude.

The memory 120 may store an operating system (OS) for controlling one or more operations of the components of the electronic apparatus 100 and various data related to the components of the electronic apparatus 100. The memory 120 may store information in various manners such as an electrical manner or a magnetic manner. The data stored in the memory 120 may be accessed by the processor 130, and reading, writing, correction, deletion, update, and the like, of the data in the memory 120 may be performed by the processor 130.

To this end, the memory 120 may be hardware for temporarily or permanently storing data or information. For example, the memory 120 may be implemented as at least one hardware of a non-volatile memory, a volatile memory, a flash memory, a hard disk drive (HDD), a solid state drive (SDD), a random access memory (RAM), or a read only memory (ROM).

The processor 130 may be implemented as a general-purpose processor such as a central processing unit (CPU) or an application processor (AP), a graphics-dedicated processor such as a graphic processing unit (GPU) or a vision processing unit (VPU), or an artificial intelligence-dedicated processor such as a neural processing unit (NPU). In addition, the processor 130 may include a volatile memory for loading at least one instruction or module.

Figure 9B:
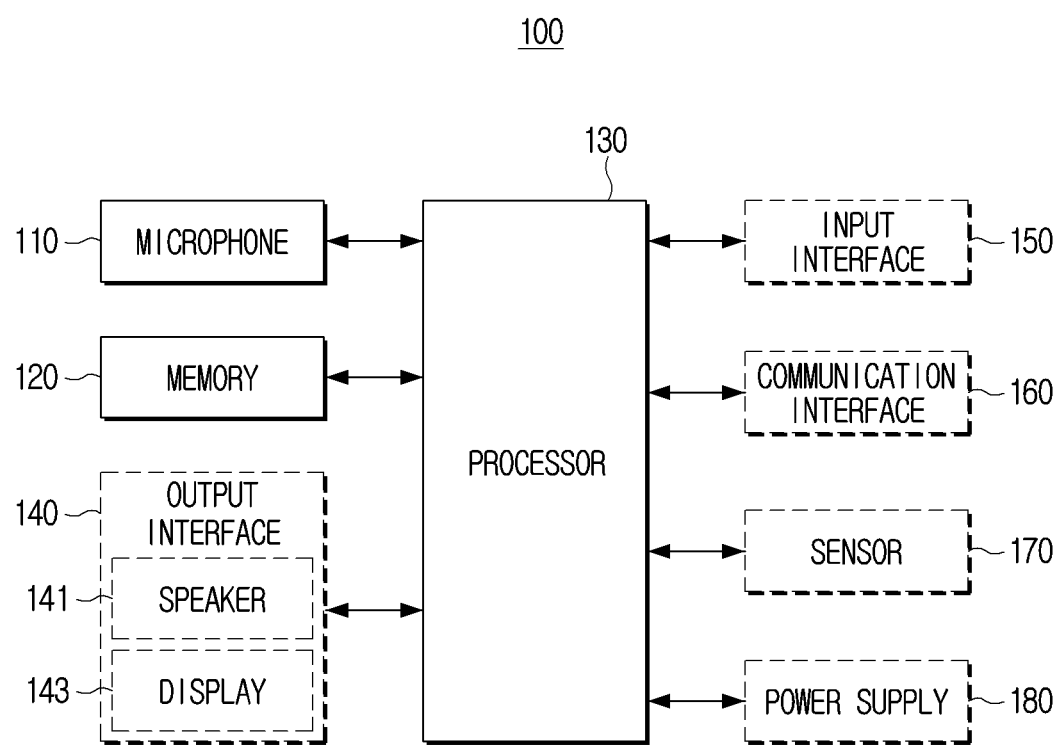
FIG. 9B is a view for describing additional hardware components of the electronic apparatus according to an embodiment.

FIG. 9B is a view for describing additional hardware components of the electronic apparatus according to an embodiment.

Referring to FIG. 9B, the electronic apparatus 100 according to an embodiment may include an output interface 140, an input interface 150, a communication interface 160, a sensor 170, and a power supply 180, in addition to the microphone 110, the memory 120 and the processor 130 described with reference to FIG. 9A.

The output interface 140 may be capable of outputting information to a user. For example, the output interface 140 may include a speaker 141 and a display 143. The speaker 141 may output various alarms or audio messages as well as various audio data on which various processing works such as decoding, amplification, and noise filtering are performed by an audio processor. The display 143 may output information or data in a visual form. The display 143 may display an image frame on one area or all areas of a display that may be driven as pixels. To this end, the display 143 may be implemented as a liquid crystal display (LCD), an organic light emitting diodes (OLED) display, a micro LED display, a quantum dot LED (QLED) display, or the like. In addition, at least a part of the display 143 may be implemented in the form of a flexible display, and the flexible display including flexible substrate may be bent, curved, or rolled like a paper.

The input interface 150 may receive various user commands and transmit the received user commands to the processor 130. That is, the processor 130 may recognize a user command input from the user through the input interface 150. Here, the user command may be implemented in various manners such as a touch input (touch panel) of the user, or a key (keyboard) or button (physical button or mouse) input.

The communication interface 160 may transmit and receive various types of data by performing communication with various types of external apparatuses according to various types of communication manners. The communication interface 160 may include at least one of a Bluetooth module (Bluetooth manner), a Wi-Fi module, a wireless communication module (cellular manner such as 3G, 4G, or 5G), a near field communication (NFC) module, an infrared (IR) module, a Zigbee module, an ultrasonic module, and the like, as a circuit performing various types of wireless communication, or an Ethernet module, a universal serial bus (USB) module, a high definition multimedia interface (HDMI), a displayport (DP), a D-subminiature (D-SUB), a digital visual interface (DVI), a thunderbolt, and components that perform wired communication.

The sensor 170 may include various sensors such as a camera, a proximity sensor, an illuminance sensor, a motion sensor, a time of flight (ToF) sensor, and a global positioning system (GPS) sensor. For example, the camera may divide light in pixel units, sense intensities of light for red (R), green (G), and blue (B) colors for each pixel, and convert the intensities of the light into electrical signals to obtain data representing a color, a shape, and a contrast of an object. For example, a type of the data may be an image having R, G, and B color values for each of a plurality of pixels. The proximity sensor may sense the presence of a surrounding object and obtain data on whether or not the surrounding object exists or whether or not the surrounding object is approaching the electronic apparatus. The illuminance sensor may sense an amount of light (or a brightness) of the surrounding environment of the electronic apparatus 100 to obtain data on illuminance. The motion sensor may sense a moving distance, a moving direction, a gradient, and the like, of the electronic apparatus 100. To this end, the motion sensor may be implemented by a combination of an acceleration sensor, a gyro sensor, a geomagnetic sensor, and the like. The ToF sensor may sense a time of flight from after various electromagnetic waves (for example, an ultrasonic wave, an infrared, a laser beam, and an ultra-wideband (UWB) wave) having a specific speed that are emitted until the various electromagnetic waves return to an original position to obtain data on a distance to a target (or a position of the target). The GPS sensor may receive radio signals from a plurality of satellites, calculate distances to each satellite using transfer times of the received signals, and obtain data on a current position of the electronic apparatus 100 using triangulation on the calculated distances. However, the implementations of the sensor 170 described above are only some examples, and the sensor 170 is not limited thereto, and may be implemented as various other types.

The power supply 180 may supply power to the electronic apparatus 100. For example, the power supply 180 may supply power to each component of the electronic apparatus 100 through an external commercial power supply or a battery.

Figure 10:
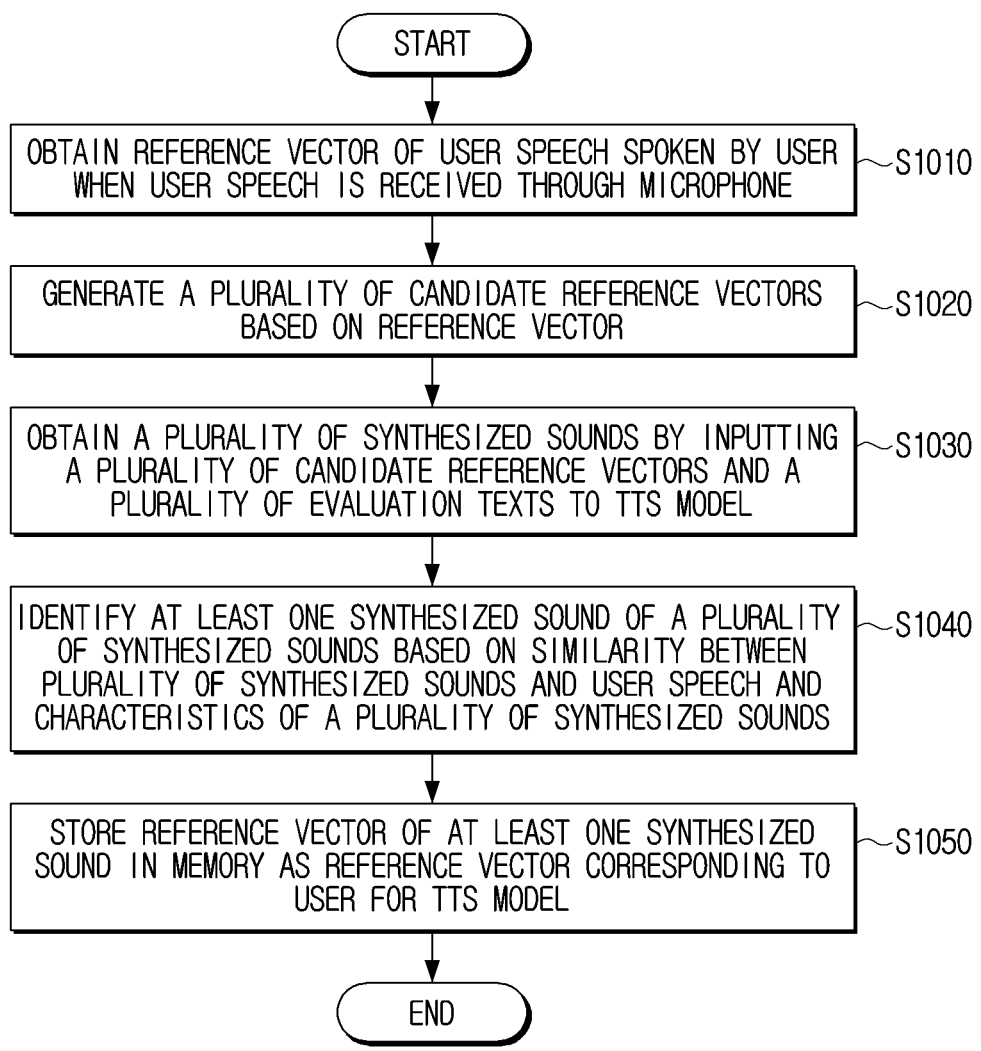
FIG. 10 is a flowchart illustrating a controlling method of an electronic apparatus according to an embodiment.

FIG. 10 is a flowchart illustrating a controlling method of an electronic apparatus according to an embodiment.

Referring to FIG. 10, the controlling method of an electronic apparatus 100 may include obtaining a reference vector of a user speech spoken by a user (S1010). When the user speech is received through the microphone 110, the electronic apparatus 100 may generate a plurality of candidate reference vectors based on the reference vector (S1020). The electronic apparatus 100 may obtain a plurality of synthesized sounds by inputting the plurality of candidate reference vectors and a plurality of evaluation texts to a TTS model (S1030), identify at least one synthesized sound of the plurality of synthesized sounds based on a similarity between the plurality of synthesized sounds and the user speech and the characteristics of the plurality of synthesized sounds (S1040), and store a reference vector of the at least one synthesized sound in the memory 120 as a reference vector corresponding to the user for the TTS model (S1050).

Furthermore, when the user speech spoken by the user is received through the microphone 110, the reference vector of the user speech may be obtained (S1010).

In addition, the plurality of candidate reference vectors may be generated based on the reference vector (S1020).

Here, the plurality of candidate reference vectors may include at least one reference vector randomly selected based on the reference vector, at least one reference vector generated based on the reference vector and the reference vector used for training the TTS model, and at least one reference vector generated by applying the masking vector to the reference vector.

In addition, the plurality of synthesized sounds may be obtained by inputting the plurality of candidate reference vectors and the plurality of evaluation texts to the TTS model (S1030).

As a specific embodiment, the plurality of synthesized sounds generated for each of the plurality of evaluation texts based on each of the plurality of candidate reference vectors may be obtained by inputting the plurality of candidate reference vectors and the plurality of evaluation texts to the TTS model.

In addition, at least one synthesized sound of the plurality of synthesized sounds may be identified based on the similarity between the plurality of synthesized sounds and the user speech and the characteristics of the plurality of synthesized sounds (S1040).

As a specific embodiment, a synthesized sound of which a similarity with the user speech is a predetermined threshold value or more among the plurality of synthesized sounds may be identified. That is, at least one synthesized sound of the candidate synthesized sounds may be identified based on at least one of the prosody, the pronunciation, or the sound quality of each of the candidate synthesized sounds.

Specifically, the prosody scores, the pronunciation scores, and the sound quality scores of each of the candidate synthesized sounds may be calculated. In addition, at least one synthesized sound of which each of the prosody score, the pronunciation score, and the sound quality score is a predetermined threshold value or more among the candidate synthesized sounds may be identified.

The plurality of evaluation texts may include at least one evaluation text belonging to each of the plurality of domains.

In this case, in the identifying of the at least one synthesized sound, the plurality of candidate synthesized sounds may be divided according to the plurality of domains based on the domain to which each of the plurality of candidate synthesized sounds belongs. In addition, at least one synthesized sound for each domain may be identified based on at least one of the prosody, the pronunciation, or the sound quality of each of one or more candidate synthesized sounds belonging to each domain.

In addition, the reference vector of the at least one synthesized sound may be stored in the memory 120 as the reference vector corresponding to the user for the TTS model (S1050).

As described above with reference to FIG. 9B, the electronic apparatus 100 according to an embodiment may further include the output interface 140 including at least one of the speaker 141 or the display 143.

In this case, in the controlling method of the electronic apparatus 100, the domain in which at least one synthesized sound does not exist among the plurality of domains may be determined. In addition, when the domain in which the synthesized sound does not exist is determined, the output interface 140 may be controlled to output information requesting speaking of a sentence belonging to the determined domain.

Specifically, at least one candidate synthesized sound belonging to the domain in which at least one synthesized sound does not exist among the plurality of domains may be determined. In addition, when the domain in which the synthesized sound does not exist is determined, the characteristics of the synthesized sound of which a relatively low score of the prosody, the pronunciation, and the sound quality may be determined based on the prosody score, the pronunciation score, and the sound quality score calculated for the determined candidate synthesized sound. In addition, the output interface 140 may be controlled to output information requesting a user to speak a sentence generated based on the determined characteristics.

The electronic apparatus 100 according to an embodiment may include the speaker 141.

In the controlling method of the electronic apparatus 100, when a subsequent user speech of the user is received through the microphone 110, a text for a response to the subsequent user speech may be obtained.

In addition, the speech generated for the text based on the reference vector may be obtained by inputting the obtained text and one of one or more reference vectors corresponding to the user stored in the memory 120 to the TTS model.

To this end, the reference vector of the synthesized sound of which the score calculated based on the characteristics of the synthesized sound is the highest among one or more reference vectors corresponding to the user stored in the memory 120 may be obtained.

In addition, the speaker 141 may be controlled to output the obtained speech.

According to the one or more embodiments described above, the electronic apparatus for providing a TTS service using a speech of a general user and a controlling method thereof may be provided. In addition, the number of sentences requested to be spoken to register the voice of the TTS service may be minimized. Also, the personalized TTS service may be provided through a voice of the user without retraining the TTS model for each user.

The one or more embodiments of the disclosure may be implemented by software including instructions stored in a machine-readable storage medium (for example, a non-transitory computer-readable storage medium). A machine may be a device that invokes the stored instruction from the storage medium and may be operated depending on the invoked instruction, and may include the electronic apparatus (for example, the electronic apparatus 100). When a command is executed by the processor, the processor may perform a function corresponding to the executed command or other components may perform the function corresponding to the executed command under the control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

The methods according to the various embodiments may be included and provided in a computer program product. The computer program product may be traded as a product between a seller and a purchaser. The computer program product may be distributed in a form of a non-transitory storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

Each of components (for example, modules or programs) according to the one or more embodiments may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the one or more embodiments may be executed in a sequential manner, a parallel manner, an iterative manner, or a heuristic manner, at least some of the operations may be performed in a different order or be omitted, or other operations may be added.

Some of the embodiments of the disclosure have been shown and described above. However, embodiments of the disclosure are not limited to the aforementioned specific embodiments. It may be understood that various modifications, substitutions, improvements and equivalents thereof can be made without departing from the spirt and scope of the disclosure. It should be understood that such modifications, substitutions, improvements and equivalents thereof shall fall within the protection scope of the disclosure, and should not to be construed independent from the disclosure.

What is claimed is:

1. An electronic apparatus comprising:
a microphone;
a memory configured to store a text-to-speech (TTS) model and a plurality of evaluation texts; and a processor configured to:
obtain a first reference vector of a user speech spoken by a user based on the user speech being received through the microphone,
generate a plurality of candidate reference vectors based on the first reference vector,
obtain a plurality of synthesized sounds by inputting the plurality of candidate reference vectors and the plurality of evaluation texts to the TTS model,
identify at least one synthesized sound of the plurality of synthesized sounds based on a similarity between characteristics of the plurality of synthesized sounds and the user speech, and
store a second reference vector of the at least one synthesized sound in the memory as a reference vector corresponding to the user for the TTS model.

2. The electronic apparatus as claimed in claim 1, wherein the plurality of candidate reference vectors comprise at least one of at least one reference vector randomly selected based on the first reference vector, at least one reference vector generated based on the first reference vector and a third reference vector used for training the TTS model, or at least one reference vector generated by applying a masking vector to the first reference vector.

3. The electronic apparatus as claimed in claim 1, wherein the processor is further configured to obtain the plurality of synthesized sounds by synthesizing each of the plurality of candidate reference vectors and each of the plurality of evaluation texts.

4. The electronic apparatus as claimed in claim 1, wherein the processor is further configured to:
identify one or more candidate synthesized sounds, among the plurality of synthesized sounds, having a similarity greater than or equal to a predetermined threshold value to the user speech, and
identify the at least one synthesized sound among the one or more candidate synthesized sounds based on at least one of a prosody, a pronunciation, or a sound quality of each of the one or more candidate synthesized sounds.

5. The electronic apparatus as claimed in claim 4, wherein the processor is further configured to:
obtain a prosody score, a pronunciation score, and a sound quality score for each of the one or more candidate synthesized sounds, and
identify the at least one synthesized sound of which each of the prosody score, the pronunciation score, and the sound quality score is greater than or equal to respective predetermined threshold values for the prosody score, the pronunciation score and the sound quality score.

6. The electronic apparatus as claimed in claim 4, wherein the plurality of evaluation texts comprise at least one evaluation text belonging to each of a plurality of domains, and wherein the processor is further configured to:
divide the one or more candidate synthesized sounds according to the plurality of domains based on a domain to which each of the one or more candidate synthesized sounds belongs, and
identify the at least one synthesized sound for each domain based on at least one of the prosody, the pronunciation, or the sound quality of each of the one or more candidate synthesized sounds belonging to each domain.

7. The electronic apparatus as claimed in claim 6, wherein a fourth reference vector of the at least one synthesized sound is stored in the memory according to a first domain to which each of the plurality of evaluation texts belongs.

8. The electronic apparatus as claimed in claim 7, further comprising an output interface including at least one of a speaker or a display,
wherein the processor is further configured to:
determine a second domain in which the at least one synthesized sound does not exist among the plurality of domains and determine characteristics of a synthesized sound belonging to the second domain in which a prosody score, a pronunciation score and a sound quality score is relatively low, and
output a speech requesting the user to speak a sentence generated based on the characteristics of the synthesized sound through the speaker.

9. The electronic apparatus as claimed in claim 1, further comprising a speaker,
wherein the processor is further configured to:
obtain a text for responding to the user speech of the user based on the user speech being received through the microphone,
obtain a speech for the text based on inputting the text and at least one reference vector corresponding to the user stored in the memory to the TTS model, and
control the speaker to output the speech.

10. The electronic apparatus as claimed in claim 9, wherein the processor is further configured to obtain the reference vector of which a score obtained based on characteristics of the text to be synthesized is highest among one or more reference vectors corresponding to the user stored in the memory.

11. A controlling method of an electronic apparatus including a memory in which a text-to-speech (TTS) model and a plurality of evaluation texts are stored, the controlling method comprising:
obtaining a first reference vector of a user speech spoken by a user based on the user speech being received through a microphone;
generating a plurality of candidate reference vectors based on the first reference vector;
obtaining a plurality of synthesized sounds by inputting the plurality of candidate reference vectors and the plurality of evaluation texts to the TTS model;
identifying at least one synthesized sound of the plurality of synthesized sounds based on a similarity between characteristics of the plurality of synthesized sounds and the user speech; and
storing a second reference vector of the at least one synthesized sound in the memory as a reference vector corresponding to the user for the TTS model.

12. The controlling method as claimed in claim 11, wherein the plurality of candidate reference vectors comprise at least one from among at least one reference vector randomly selected based on the first reference vector, at least one reference vector generated based on the first reference vector and a third reference vector used for training the TTS model, and at least one reference vector generated by applying a masking vector to the first reference vector.

13. The controlling method as claimed in claim 11, wherein the obtaining the plurality of synthesized sounds comprises, obtaining the plurality of synthesized sounds by synthesizing each of the plurality of candidate reference vectors and each of the plurality of evaluation texts.

14. The controlling method as claimed in claim 11, wherein the identifying the at least one synthesized sound comprises:
identifying one or more candidate synthesized sounds among the plurality of synthesized sounds having a similarity greater than or equal to a predetermined threshold value, to the user speech, and identifying the at least one synthesized sound among the one or more candidate synthesized sounds based on at least one of a prosody, a pronunciation, or a sound quality of each of the one or more candidate synthesized sounds.

15. The controlling method as claimed in claim 14, wherein the identifying the at least one synthesized sound comprises:

obtaining a prosody score, a pronunciation score, and a sound quality score for each of the one or more candidate synthesized sounds, and identifying the at least one synthesized sound of which each of the prosody score, the pronunciation score, and the sound quality score is greater than or equal to respective predetermined threshold values for the prosody score, the pronunciation score and the sound quality score.

* * * * *